US007554930B2

(12) United States Patent  
Gaddis et al.

(10) Patent No.: US 7,554,930 B2
(45) Date of Patent: Jun. 30, 2009

(54) INTERNET ROUTE DEAGGREGATION AND ROUTE SELECTION PREFERENCING

(75) Inventors: Michael E. Gaddis, DeFiance, MO (US); Peter N. Hicks, Webster Groves, MO (US); David Barmann, Valley Park, MO (US); Steven T. Nunes, Edwardsville, IL (US)

(73) Assignee: Level 3 Communications, LLC, Broomfield, CO (US)

( * ) Notice: Subject to any disclaimer, the term of this patent is extended or adjusted under 35 U.S.C. 154(b) by 682 days.

(21) Appl. No.: 11/084,804

(22) Filed: Mar. 18, 2005

(65) Prior Publication Data

US 2005/0201302 A1 Sep. 15, 2005

Related U.S. Application Data

(62) Division of application No. 09/594,461, filed on Jun. 14, 2000, now abandoned.

(51) Int. Cl.
*H04L 12/28* (2006.01)
*H04L 12/56* (2006.01)

(52) U.S. Cl. .................. 370/254; 370/389; 370/395.31; 707/1; 707/100; 709/224; 709/229; 713/1; 713/185; 726/3; 726/22

(58) Field of Classification Search .................. None
See application file for complete search history.

(56) References Cited

U.S. PATENT DOCUMENTS

| 5,233,604 | A | * | 8/1993 | Ahmadi et al. ............. 370/238 |
| 5,926,101 | A | | 7/1999 | Dasgupta ............... 340/825.02 |
| 6,009,081 | A | | 12/1999 | Wheeler et al. ............. 370/255 |
| 6,038,600 | A | | 3/2000 | Faulk, Jr. et al. ............ 709/224 |

(Continued)

FOREIGN PATENT DOCUMENTS

CN 1424756 A 6/2003

(Continued)

OTHER PUBLICATIONS

Rekhter & Gross, "BGP-4 Application" (RFC 1772), Mar. 1995, p. 10.*

(Continued)

*Primary Examiner*—Gregory B Sefcheck
*Assistant Examiner*—Salvador E Rivas
(74) *Attorney, Agent, or Firm*—Fellers, Snider, Blankenship, Bailey & Tippens

(57) ABSTRACT

A method and system for managing the routing of traffic within a network develops a topological address space map of the network to enable a "best route" selection process. The network is comprised of a backbone connected to a plurality of peering partners. Points on the network monitor traffic flows. A central facility analyzes the traffic flows and routes within the network and performs intelligent routing management.

Intelligent routing management ensures that traffic is properly routed through preferred routes on the network, and avoids inefficient routing. Intelligent routing management also selects new routes to be injected into the network in order to further improve the accuracy of the address space map of the network. Intelligent routing management ensures that bandwidth is requested and delivered topologically closely to peering partner networks, and that traffic is carried by the backbone for long haul data distribution in both directions.

16 Claims, 16 Drawing Sheets

U.S. PATENT DOCUMENTS

| | | | |
|---|---|---|---|
| 6,069,895 A | 5/2000 | Ayandeh | 370/399 |
| 6,094,682 A * | 7/2000 | Nagasawa | 709/224 |
| 6,178,235 B1 * | 1/2001 | Petersen et al. | 379/134 |
| 6,411,997 B1 | 6/2002 | Dawes et al. | 709/224 |
| 6,421,434 B1 | 7/2002 | Rosu | 379/133 |
| 6,501,752 B1 | 12/2002 | Kung et al. | 370/352 |
| 6,574,663 B1 | 6/2003 | Bakshi et al. | 709/223 |
| 6,584,093 B1 | 6/2003 | Salama et al. | 370/351 |
| 6,598,034 B1 | 7/2003 | Kloth | 706/47 |
| 6,618,755 B1 | 9/2003 | Bonn | 709/223 |
| 6,633,585 B1 | 10/2003 | Ghanwani et al. | 370/468 |
| 6,728,215 B1 | 4/2004 | Alperovich et al. | 370/252 |
| 6,728,777 B1 | 4/2004 | Lee et al. | 709/238 |
| 6,763,000 B1 | 7/2004 | Walsh | 370/252 |
| 6,801,534 B1 * | 10/2004 | Arrowood et al. | 370/400 |
| 2002/0002686 A1 * | 1/2002 | Vange et al. | 713/201 |
| 2003/0131263 A1 * | 7/2003 | Keane et al. | 713/201 |
| 2003/0145246 A1 * | 7/2003 | Suemura | 714/2 |

FOREIGN PATENT DOCUMENTS

| | | |
|---|---|---|
| JP | 3-191541 | 8/1991 |
| JP | 2003-78171 | 3/2003 |
| WO | WO 98/20724 A2 | 5/1998 |
| WO | WO 98/20724 A3 | 5/1998 |
| WO | WO 00/38381 A1 | 6/2000 |

OTHER PUBLICATIONS http://info.internet.isi.edu/in-notes/rfc/files/rfc1771.txt; Network Working Group, Requests for Comments: 1771, Obsoletes: 1654, Category: Standards Track; Editors: Y. Rekhter, T.J. Watson; Research Center, IBM Corp., T. Li, Cisco Systems, Mar. 1995; "A Border Gateway Protocol 4 (BGP-4)"; pp. 1-50; [retrieved on Mar. 27, 2000].

http://info.internet.isi.edu/in-notes/rfc/files/rfc177.txt; Network Working Group, Requests for Comments: 1772, Obsoletes: 1655, Category: Standards Track; Editors: Y. Rekhter, T.J. Watson; Research Center, IBM Corp., P. Gross, MCI; Mar. 1995; "Application of the Border Gateway Protocol in the Internet"; pp. 1-17; [retrieved on Mar. 27, 2000].

http://www.ec.enron.com/about/; Enron Broadband Services, Inc.; "About Enron Broadband Services" Copyright 1997-2000 Enron Corp.; pp. 1, 2; [retrieved on May 2, 2000].

http://www.ec.enron.com/isp/ein/interagent.html; Enron: ISPs; Enron Broadband Services; "InterAgent® Software", Copyright 1997-2000 Enron Corp.; pp. 1 of 1; [retrieved on May 2, 2000].

http://www.ec.enron.com/isp/ein/more_interagent.html; Enron: ISPs; Enron Broadband Services; "More About InterAgent® Software", Copyright 1997-2000 Enron Corp.; pp. 1, 2; [retrieved on May 2, 2000].

http://www.internap.com/html/how_botright.htm; InterNAP's Technology Works; INTERNAP © Network Services; "How it works"; pp. 1-3; [retrieved on Feb. 10, 2000].

http://www.internap.com/html/why_botright.htm; InterNAP; Why The Internet Is So Slow; INTERNAP © Network Services; "Why is the Internet so slow"; pp. 1, 2; [retrieved on Feb. 10, 2000].

http://www.internap.com/html/news_pr_02102000.htm; InterNAP: Press Release; INTERNAP © Network Services; "BizRate.com Selects InterNAP's High Performance Internet Connectivity"; pp. 1-3; [retrieved on Feb. 10, 2000].

http://www.cisco.com/univercd/cd/td/doc/cisintwk/ics/icsbgp4.htm; Using the Border Gateway Protocol for Interdomain Routing; Copyright 1989-2000 © Cisco Systems Inc.; Posted Wed. Feb. 9 13:25 PST 2000; pp. 1-65; [retrieved May 8, 2000].

Paxon, Measurements and Analysis of End-to-End Internet Dynamics; Chapter 8, Routing Symmetry, p. 92-100 (Jun. 1997).

Search report dated Aug. 21, 2007 from corresponding Chinese Patent Appln. No. 200510056380.1.

Search report dated Sep. 19, 2007 from corresponding Japnese Patent Appln. No. 2004-266923.

* cited by examiner

| IP ADDRESS | PREFIX | ROUTE INTERFACE | % OF TRAFFIC SEEN BY SITE 250 |
|---|---|---|---|
| 216.0.0.0 | /8 | 150A | 50 |
| 216.0.0.0 | /8 | 150B | 50 |
| 216.0.0.0 | /8 | 150C | 0 |
| 216.0.0.0 | /8 | 150D | 0 |

| IP ADDRESS | PREFIX | ROUTE INTERFACE | % OF TRAFFIC SEEN BY SITE 250 |
|---|---|---|---|
| 216.100.0.0 | /16 | 150A | 100 |
| 216.25.0.0 | /16 | 150B | 100 |
| 216.10.0.0 | /16 | 150C | 0 |
| 216.5.0.0 | /16 | 150D | 0 |

IP Statistics Data Table 500

| IP Address | Mask | Prefix length | Exchange ID | Interface number | Packet count | Byte count | Strength | Pointer to associated route entry |
|---|---|---|---|---|---|---|---|---|
| 140.150.0.0 | 11111111.11111111.11111111.11110000.0000 | /20 | POP 330 | 5 | 10000 | | | |
| 140.150.16.0 | 11111111.11111111.11111111.11110000.0000 | /20 | POP 330 | 5 | 10 | | | |
| 140.150.16.0 | 11111111.11111111.11111111.11110000.0000 | /20 | POP 330 | 6 | 100 | | | |
| 140.150.32.0 | 11111111.11111111.11111111.11110000.0000 | /20 | POP 330 | 5 | 10 | | | |
| 140.150.32.0 | 11111111.11111111.11111111.11110000.0000 | /20 | POP 330 | 7 | 100 | | | |

Figure 5A

Route Entry Table 510

| IP Address | Mask | Prefix length | Exchange ID | Interface number | Strength | Next hop | Peer ID | AS Path | MED | Status flags | Packet count | Byte count |
|---|---|---|---|---|---|---|---|---|---|---|---|---|
| 140.150.0.0 | 11111111.11111111.00000000.00000000.00000000 | /16 | POP 330 | 5 | | 140.100.1.1 | 1 | 100 | 5 | | 10020 | |
| 140.150.0.0 | 11111111.11111111.00000000.00000000.00000000 | /16 | POP 332 | 6 | | | 2 | 100 • 50 | 5 | | 100 | |
| 140.150.0.0 | 11111111.11111111.00000000.00000000.00000000 | /16 | POP 334 | 7 | | | 4 | 100 • 200 • 50 | 10 | | 100 | |

Figure 5B

INTERNET ROUTE DEAGGREGATION AND ROUTE SELECTION PREFERENCING

CROSS REFERENCE TO RELATED APPLICATION

This application is a divisional application and claims the benefit of copending U.S. patent application Ser. No. 09/594,461, filed Jun. 14, 2000, which application is hereby incorporated by reference.

BACKGROUND

1. Field of the Invention

The present invention relates generally to network routing, and more particularly, to dynamically determining regional address locations for best exit routing based upon route deaggregation and route selection preferencing.

2. Background of the Invention

The growth of the Internet, and the World Wide Web (WWW) in particular, has led to enormous increases in the amount of traffic flowing over the group of connected networks that comprise the Internet and connected network systems. Access providers such as Internet Service Providers (ISPs) provide connections for businesses and individuals to connect to the Internet and access the WWW. ISPs must interconnect in order to allow their customers to reach points on the Internet serviced by other ISPs.

The exchange of traffic between Internet service providers (ISPs), where traffic from one ISP's customers is destined for customers of another ISP, is referred to as "peering." This is contrasted with "transit," where the traffic that is exchanged is destined not only for the receiving ISPs customers, but also for other users throughout the Internet (which are in turn reached via the receiving ISPs peering connections). ISPs generally charge for transit connections, while peering connections do not involve an exchange of money. Therefore, peering provides free bi-directional exchange of customer traffic between ISPs whereas transit provides paid access to the entire Internet. For example, large ISPs with their own national backbones often mutually agree with other large ISPs with national backbones to freely exchange their customer data. An Internet backbone is the central part of an ISP's network which transports data between edge, or regional, parts of the networks and Internet peering points. Instead of peering, large ISPs that have a national backbone offer transit service to smaller, regional ISPs who cannot offer reciprocal backbone sharing. These smaller ISPs use the larger ISPs national backbones to reach users outside of their service areas.

Peering connections are based upon the underlying assumption that traffic flows between two different ISPs will be approximately equal. These mutual agreements to exchange information traffic (bandwidth) freely and without charge do not make economic sense if one peering partner is forced to carry substantially more traffic than another. Unbalanced bandwidth may affect peering relationships because most peered data is routed between peers using a routing method called "hot potato routing."

In hot potato routing, an originating peer network carrying a customer's traffic finds the nearest entry point to the destination peer's network and drops the traffic off as soon as possible. There is no incentive for a carrier to transport additional bandwidth if a peer network is available to carry the traffic. Likewise, the destination peer network will send returning data to the originator's network from its nearest entry point into the originator's network. If the two exchange points used for this data transfer are geographically dispersed, this type of routing creates an asymmetric routing path between two network terminations whereby one "to" path travels primarily on the destination peer's network and the "from" path travels primarily on the originator's network. If the amount of bandwidth used is symmetric in both directions and the two networks have similar geographic scope then this creates a fair economic exchange. Each peer carries half the bandwidth and each peer has (presumably) one paying customer to pay for its half of the transfer. This is the basic barter proposition underlying Internet peering.

However, although Internet peering models are generally based upon the assumption of symmetric bandwidth between peers, this assumption has proven to be flawed. The growth of the WWW and increases in WWW traffic have exacerbated the problem of bandwidth asymmetry. Web content providers tend to transmit copious amounts of data. Bandwidth between Web content providers and the individuals who view Web content is often unbalanced. Web content providers typically send as much as 4 to 10 times more bandwidth than they receive. An individual might request a Web page by sending just a single address or page request, whereas the Web page content provider returns multiple Web pages to the individual, thereby consuming large amounts of bandwidth.

For example, consider a scenario between ISP A, servicing an individual, and ISP B, servicing a Web content provider. ISP A and B both use hot-potato routing, dumping network traffic off at the closest entry point to the peering ISP. ISP A receives a request for a Web page, and routes the request such that the request is carried by ISP B for a majority of the distance traveled (hot potato routing). ISP B returns the requested Web page, constituting a considerably larger amount of bandwidth than the initial request from the individual. ISP B similarly uses hot potato routing, which results in ISP A carrying the Web traffic for the majority of the distance traveled. ISP A is forced to carry more than its fair share of the bandwidth traffic burden in this scenario. Furthermore, ISP A is unable to charge its own customers more for the extra bandwidth, because the entity originating the extra bandwidth is a customer of ISP B. The current peering system does not provide the proper economic incentives for an ISP to increase its bandwidth, because the increased bandwidth may be consumed by the ISP's peers.

Web content providers are often constrained by the bandwidth limitations they experience through their ISP. Some Web content providers attempt to solve this problem by becoming multi-homed, i.e., by contracting for service with multiple ISPs to purchase additional bandwidth capacity and presumably to purchase redundancy. However, the addition of redundant paths to each potential client terminal results in increased complexity. Being multi-homed requires thinking and acting like a backbone Internet network operator, and having the capability to properly route traffic.

The resulting burden of best path management is a difficult task and not one that will likely be mastered by most Web content providers. The Border Gateway Protocol (BGP) (which is used to route data between networks on the Internet) is a poor tool, with limited best path information available to the automated decision making process in the router. Micro-engineering good connectivity to many providers requires substantial knowledge of not only the BGP protocol and its rules but also requires substantial knowledge of the network structure and operational capabilities of the downstream providers themselves.

Thus Web content providers, as well as other Internet consumers, need a system allowing them to purchase large amounts of network bandwidth without requiring each Web content provider to become an expert at Internet routing. However, because Web traffic contributes substantially to the peering bandwidth asymmetry problem, a method is required to compensate all network carriers for the Web bandwidth they carry, including Web traffic that originates in a network peer. An economically rational system is needed for providing Web bandwidth, whereby Web content providers pay the true cost of their service and ISPs are paid for the Web bandwidth that crosses their network systems.

SUMMARY OF THE INVENTION

The present invention allows Web content providers and other Internet bandwidth consumers ("content providers") to obtain the Internet bandwidth they require, while providing a system for paying access providers on a per-bit basis for the traffic they carry. The system manages and facilitates the routing of traffic within the system through the development of a topological "address space map" of the system to enable a "best route" selection process. The "topology" of the network is analogous to the geography of the network in circuit route distances. Content providers do not have to be concerned with multi-homing routing issues, and access providers are assured that they will be paid for the use of their network.

An intelligent routing exchange system comprises a backbone interconnected to a set of peering partner networks. The backbone is used to carry long-haul traffic. A central Network Operations Center (NOC) develops a topological address space map of the overall intelligent routing network, and performs routing management. The intelligent routing management system ensures that bandwidth is requested and delivered regionally to peering partner networks, and that traffic is carried by the backbone for long haul data distribution in both directions. The exchange system uses cold potato routing for all traffic being sent to regional carriers, and hot potato routing for all traffic received from regional carriers. By ensuring that peering partners carry only regional traffic, the peering partners no longer suffer from unfairly carrying asymmetric bandwidth from peer access providers.

The backbone is connected to a pool of peering partner networks through a set of regional Points of Presence (POPs) on the backbone. The peering partners are well-connected major traffic carriers who typically connect to multiple POPs. Contracts with each peering partner will be negotiated to ensure that the overall intelligent routing system provides sufficient bandwidth for transferring traffic onto and off of the backbone.

Customers of the intelligent routing system connect to the intelligent routing system at one of the POPs. A customer may be, for example, a Web hosting company, an individual Internet Service Provider, or a corporate customer. Each customer signs up for the intelligent routing system service, and obtains a specific POP connection location.

Each peering partner is paid a fee for every bit sent from the backbone across their network to their access customer terminations. Customers are billed on a pro-rata basis based upon their actual utilization of the backbone.

Implementing the regional delivery of all traffic on the backbone requires detailed information about the topological locations of groups of Internet Protocol (IP) addresses within the interconnected peering partner networks, relative to the location of entry points to the backbone. The central NOC develops an address space map providing such detailed information about the intelligent routing network by monitoring the network traffic. Information on the amount of traffic received at each POP entry point from various IP address ranges is gathered at each POP. The POP data is sent to the NOC for processing.

The NOC develops "best route" information, which is distributed back to the set of POPs and the interconnected peering partner networks. The "best route" information ensures that traffic is properly routed through preferred routes on the intelligent routing network, keeping traffic on the backbone when possible, and avoiding inefficient routing. The NOC also selects new routes to be injected into the intelligent routing network in order to further improve the accuracy of the address space map.

BRIEF DESCRIPTION OF THE DRAWINGS

FIG. 5A is an illustration of an IP statistics data table in an embodiment of the present invention.

FIG. 5B is an illustration of a route entry table in an embodiment of the present invention.

DETAILED DESCRIPTION OF THE PREFERRED EMBODIMENTS

Reference will now be made in detail to several embodiments of the present invention, examples of which are illustrated in the accompanying drawings. Wherever practicable, the same reference numbers will be used throughout the drawings to refer to the same or like parts.

Introduction

Figure 1A:
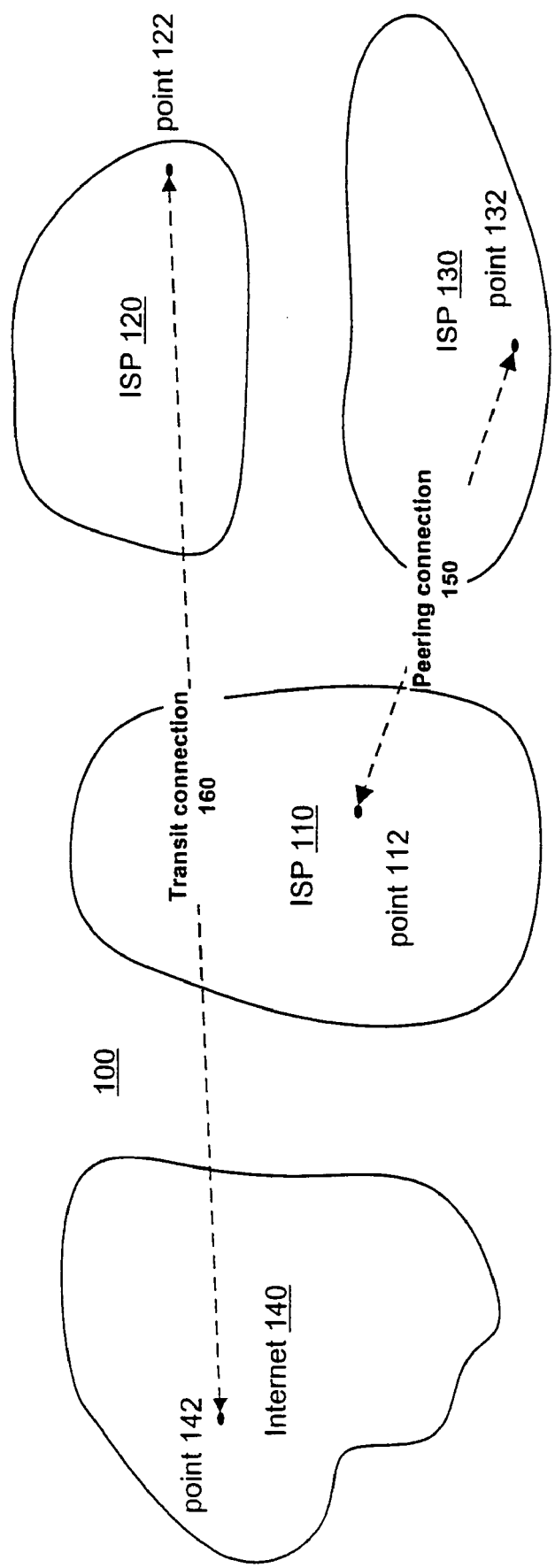
FIG. 1A is an illustration of a network using typical peering and transit connections between different ISPs.

FIG. 1A provides background information on existing systems for carrying Internet and Web traffic. FIG. 1A shows a communications network 100. Network 100 includes three Internet Service Providers (ISPs) 110, 120, and 130 and a representation of the Internet 140. ISP 110 includes a point 112; ISP 120 includes a point 122; ISP 130 includes a point 132; and the Internet 140 includes a point 142. Each point represents a particular Internet Protocol (IP) address within the network 100. Each ISP represents a set of equipment and telecommunication lines providing Internet access for a certain geographic region. An ISP provides an Internet connection to various individuals and companies, wherein each individual and company has an IP address or IP address range. The Internet 140 represents the worldwide system of computer networks, of which one part is the World Wide Web ("the Web" or "WWW").

Individual ISPs 110, 120 and 130 are not each individually connected to all network 100 destinations. ISPs 110, 120 and 130 use a system of peering and transit connections to access other parts of the network 100. Peering and transit connections allow regional networks to offer access to out-of-network destinations by negotiating for the use of other regional networks. ISPs often interconnect at network focal points such as the Network Access Points in the United States and at regional or international switching points. Connecting ISPs exchange routing information with each other, typically using the Border Gateway Protocol (BGP).

Peering connection 150 connects ISP 110 and ISP 130. A peering connection is a negotiated agreement between two network carriers to allow for a mutual traffic exchange. As shown in FIG. 1A, in order to permit point 112 of ISP 110 to access point 132 of ISP 130, the ISPs 110 and 130 exchange traffic across peering connection 150.

Transit connection 160 connects ISP 120 with the Internet 140. A transit connection passes through one network to connect to a second network. For example, as shown in FIG. 1A, in order for point 142 of the Internet 140 to be reached by point 122 of ISP 120, it is necessary for traffic to be routed across ISP 110.

Figure 1B:
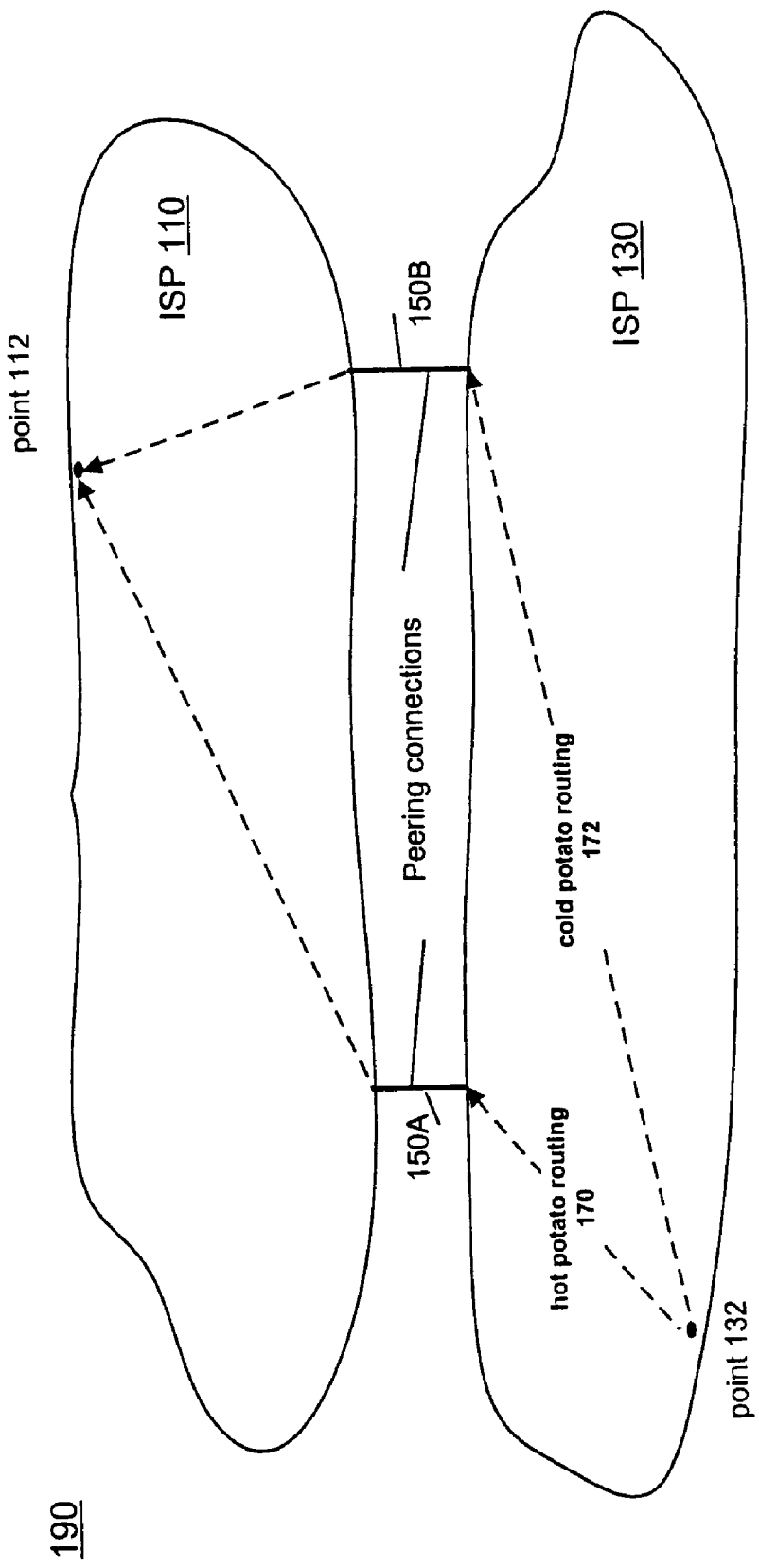
FIG. 1B is an illustration of "hot potato routing" and "cold potato routing" between two ISPs.

FIG. 1B is an illustration of "hot potato routing" and "cold potato routing" between two ISPs in a network 190. ISP 110 and ISP 130 are connected via two different peering connections 150A and 150B. ISPs that exchange peering traffic ("peering partners") may typically have multiple peering connections in different geographic regions. ISP 110 contains a point 112 representing a particular IP address contained within ISP 110's network. Point 112 is only reachable via ISP 110. Similarly, ISP 130 contains a point 132 representing a particular IP address within ISP 130's network.

Assume that point 132 of ISP 130 wishes to send traffic to point 112 of ISP 110. This traffic may be routed in two different ways. ISP 130 may select the closest peering connection to source point 132 (peering connection 150A) in order to remove the traffic from ISP 130's network as quickly as possible. This method of dumping traffic off of one's own network as quickly as possible is referred to as "hot potato" routing. Alternative, ISP 130 may retain the traffic on its own network for as long as possible, and utilize the peering connection closest to the destination point 112 (peering connection 150B). This method of retaining traffic on one's own network for as long as possible is referred to as "cold potato" routing.

The hot potato routing typically performed by most peering partners does not require knowledge of other peering partners' network address space. For example, in order to route traffic from point 132 to point 112 via hot potato route 170, ISP 130 only needs to be able to determine its own closest peering connection to ISP 110. ISP 130 only needs knowledge of its own internal network in order to determine that peering connection 150A is closer to point 132 than is peering connection 150B.

By contrast, in order to be able to optimally perform cold potato routing 172 of traffic, ISP 130 must be able to make intelligent routing decisions. ISP 130 must know where the peering connections 150A and 150B between ISP 130 and ISP 110 are located. ISP 130 must also be able to recognize that point 112 located in ISP 110 is topologically closer to peering connection 150B as opposed to peering connection 150A. The "topology" of the network is analogous to the geography of the network in circuit route distances. This intelligent routing decision requires knowledge of the address space of peering partner ISP 110. Some routing information can be obtained via BGP routing information. However, BGP information may be inaccurate and incomplete, and also may be manually altered.

Figure 2A:
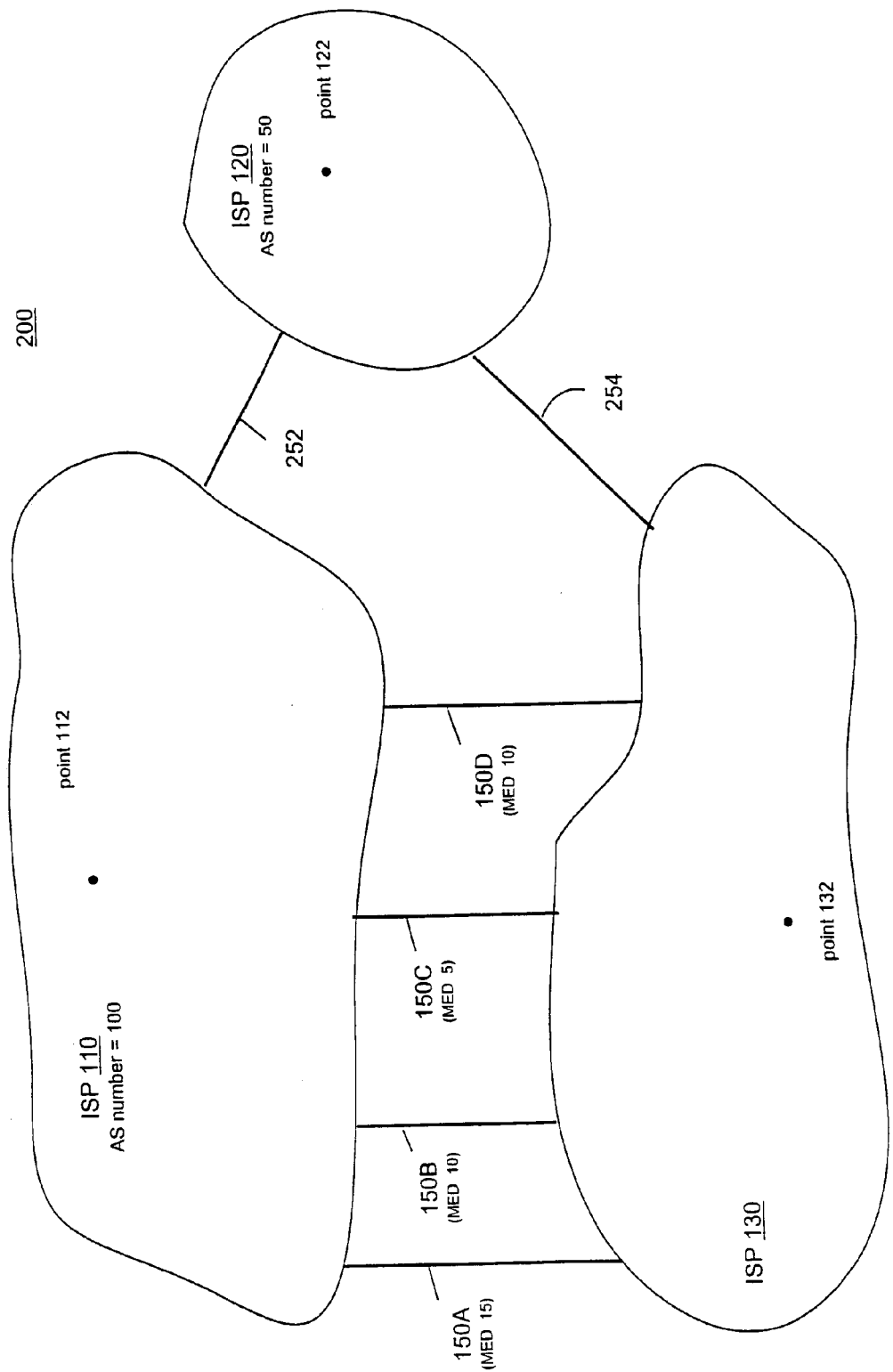
FIG. 2A is an illustration of connections between different ISPs.

FIG. 2A illustrates the types of connections present between ISPs. Network 200 includes three ISPs 110, 120 and 130. ISP 110 includes a point 112; ISP 120 includes a point 122; and ISP 130 includes a point 132. Four different peering connections connect ISP 110 and ISP 130: 150A, 150B, 150C and 150D. Peering connection 252 connects ISP 110 and ISP 120. Peering connection 254 connects ISP 120 and ISP 130.

Network 200 communicates using BGP to route traffic among various IP addresses, or points, in the network. BGP is a protocol for exchanging routing information in a network of autonomous systems (AS). In the following example, it will be assumed that each ISP is a single autonomous system. An AS is a network or group of networks controlled by a single network administrator or routing authority. Each AS will comprise a connected group of one or more IP address ranges. Each AS has an AS number: ISP 110 has an AS number of 100, and ISP 120 has an AS number of 50.

Routers route traffic between ASs using BGP routing information. Routers between different ASs announce routes to each other in order to allow routers to acquire knowledge of destinations outside of their own AS. Each route announcement contains specific route information, including such items as a list of known routers, a list of addresses reachable from each router, and (optionally) the cost metric associated with each path to help ensure the best route is chosen.

One particular type of cost metric is AS_Path. The AS_Path attribute keeps track of the various ASs that a particular route goes through. Each individual AS through which the route passes is identified in the AS_Path attribute with a particular AS number. Each time that a route passes through a new AS, the new AS appends its AS_Path attribute to the list of AS numbers for the route. For example, assume that in network 200, point 112 wishes to send traffic to point 132. The traffic route via the set of connections 150 from point 132 to point 112 will include an AS_Path attribute of 100. The traffic route between points 112 and 132 via connections 252 and 254 will include an AS_Path of 50, 100. The route with the longer AS_Path will generally not be the preferred route, and therefore a route via a connection 150 will generally be used if the AS_Path attribute is followed.

However, the AS_Path attribute does not help in distinguishing between multiple routes connecting the same two autonomous systems. For example, assume a traffic route between ISP 110's point 112 and ISP 130's point 132 is desired. There are four peering connections between ISP 110 and ISP 130 (150A, B, C and D), and the AS_Path attribute will have the same value for each connection. In this case, the multi-exit discriminator (MED) attribute provides information to external neighboring ASs about the preferred path into an AS when there are multiple entry points into the AS. A lower MED attribute is preferred, and the default MED value is zero.

For example, ISP 110 may announce the following MEDs for the set of connections 150:

| CONNECTION | MED |
|---|---|
| 150A | 15 |
| 150B | 10 |
| 150C | 5 |
| 150D | 10 |

In this example, the shortest MED corresponds to 150C. This will be the preferred route between points 112 and 132 if the MED attribute is followed.

The AS_Path attribute is transitive, meaning it is passed along to each network in a route. However, the MED attribute is non-transitive, meaning it is only exchanged between adjacent networks and is not passed on throughout the route.

The AS_Path and MED values announced by an AS may not always provide accurate routing information. For example, an AS may deliberately alter the AS_Path or MED value they announce in order to preference one route over another. Additionally, the AS_Path and MED information alone may not provide enough information about a route to ensure that the best path for sending traffic is chosen. Routing tables are often large, and in order to save space addresses are grouped into address ranges using an address mask. This allows for smaller routing tables, but may provide less accurate information on routing to a specific address.

The inaccuracies that may be present in the BGP AS_PATH and MED information are typical examples of BGP routing problems. In general, BGP routing is a complex and often confusing decision-making process, and BGP routing values alone cannot be trusted to accurately reflect the best routing path in a network. BGP gives very broad information about network path characteristics. There are no fixed, standardized bandwidth, reliability, or distance path attributes for evaluating routes. All information must be trusted from source and intermediate networks. Intermediate networks may override route parameters from the originating network, and thereby influence best path calculations down stream.

Address Space Map

Figure 2B:
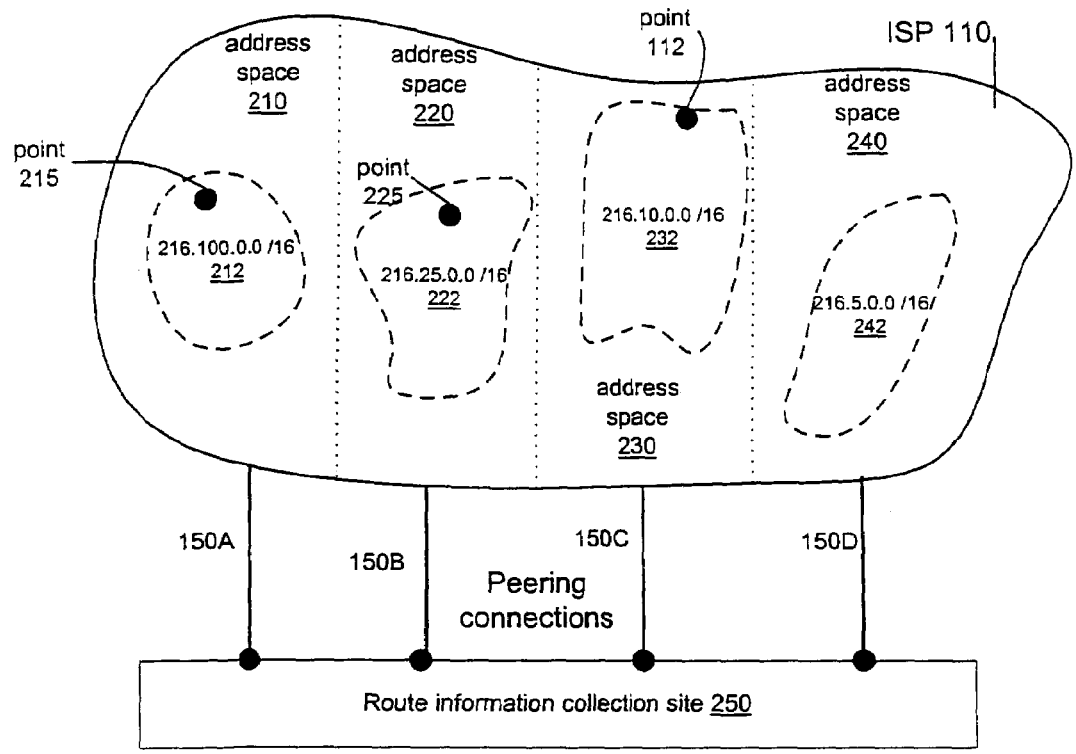
FIG. 2B is an illustration of the deaggregation of the address space of an ISP in an embodiment of the present invention.

FIG. 2B illustrates the deaggregation of the address space of an ISP in an embodiment of the present invention. The present invention improves network routing by collecting route information and compiling a topological address space map of the relevant address space. An address space map as described herein is a detailed picture of the location of different IP addresses within the network of interest. In order to understand the process of compiling such an address space map, it is necessary to provide a background of the currently existing IP addressing scheme used in Internet and Web traffic routing.

An IP address is a 32-bit number that is assigned to a termination point (generally a single machine) in an Internet network connection. The IP address of the source and destination termination points are appended to each packet routed across the Internet network. In "dotted quad notation," an example 32 bit address might be: 140.25.5.5. Each of the decimal numbers is represented by 8 bits, and ranges from 0 to 255. Thus in decimal the address 140.25.5.5 translates to 10001100.00011001.00000101.00000101. Some portion of the IP address represents the local machine address (also known as the host address), and the rest of the IP address represents the network address. An organization may use some of the bits in the host address to identify a specific subnet. Typically, a subnet may represent all of the machines in a particular geographic location.

Once a particular packet arrives at its destination organization's gateway or connection point, routing within the organization's subnet is performed by local routers using the host numbers. The global routers external to the organization generally do not need to be concerned with host numbers. A router determines what bits in an IP address it needs to be concerned with by using a mask. A mask is applied to an IP address, and only the IP address numbers corresponding to a 1 in the mask are looked at. For example, if the network address portion of the IP address is 140.25, the subnet is 5, and the host address is 5, a mask to direct the router to only look at the network address would be: 11111111.11111111.00000000.00000000, or 255.255.0.0. Such a mask is also referred to as a "prefix length 16" or a "/16", because 16 of a possible 32 binary digits will be looked at.

Once a mask is applied to an IP address, the resulting IP address refers to a range of different IP addresses. For example, an IP address 140.25.1.1/32 refers to a single address. However, the IP address 140.25.1.1/24 covers a range of 255 different IP addresses: 140.25.1.0 to 140.25.1.255.

Therefore, an IP address with a /12 prefix length will provide less address granularity than an IP address with a /16 prefix length. The prefix length determines how many of the IP address's binary digits will be looked at in routing to that IP address, and a larger prefix length will look at more of the 32-bit IP address. As more of the IP address's binary digits are looked at, the address range represented by that IP address grows smaller.

An address space map determines where different address ranges are located in a network. As larger prefix length masks are applied to developing an address space map, the granularity of the map will also increase. This process of increasing the granularity of the address space map is referred to as the "deaggregation" of the address space.

An address space map is developed by looking at IP addresses and the routes followed to reach those addresses. Based upon knowledge of the routing rules used within the network, an address space map is developed which associates topological regions of the network with particular IP address ranges. This address space map is used in making logical routing decisions for traffic flowing through a network.

FIG. 2B includes an ISP 110 connected to a route information collection site 250 via four peering connections 150A, 150B, 150C and 150D. Each peering connection connects to site 250 at a different point of presence (POP), wherein each POP is an entrance point into the site 250 network. Address space 210 of ISP 110 is the portion of the ISP 110 network that is topologically closest to peering connection 150A. Similarly, address space 220 is topologically closest to peering connection 150B, address space 230 is closest to peering connection 150C, and address space 240 is closest to peering connection 150D.

The "topology" of the network is somewhat analogous to the geography of the network in circuit route distances. For example, assume university A and university B are located across the street from each other in San Francisco, and their network addresses are thus geographically close to each other. Further assume company A provides an Internet connection to university A, and company B provides an Internet connection to university B. If the networks of company A and company B are only connected to each other via a connection in Los Angeles, the network addresses of university A and university B are not topologically close to each other, because all traffic between the two networks must pass through Los Angeles.

Topological distances are not directly related to geographic distances. A network operator may change the network topology based upon route metrics/cost per circuit. For example, a network operator may set a network to prefer a route from Los Angeles to Denver via Dallas instead of via San Francisco. Such network routing preferences are typically used to route around bandwidth problems.

IP address range 216.100.0.0 /16 is contained within address space 212, located within address space 210. IP address range 216.25.0.0 /16 is contained within address space 222, located within address space 220. IP address range 216.10.0.0 /16 is contained within address space 232, located within address space 230. IP address range 216.5.0.0 /16 is contained within address space 242, located within address space 240. Point 215 corresponds to IP address 216.100.5.0 /32, and is located in address space 212. Point 225 corresponds to IP address 216.25.5.1 /32, and is located in address space 222. Point 112 corresponds to IP address 216.10.5.5 /32, and is located in address space 232.

ISP 110 uses hot potato routing to route network traffic onto neighboring networks as quickly as possible. The route information collection site 250 monitors incoming traffic and collects the traffic's source IP address, the mask used, and the arrival interface (the arrival peering connection). Site 250 also calculates the percentage of traffic with a certain IP address and mask that arrives on each particular interface. Using this information, route information collection site 250 develops an address space map of ISP 110's network. The address space map associates particular IP address ranges with their topologically closest peering connection to site 250.

The granularity of the address space map developed by site 250 depends upon the prefix length of each IP address range. For example, point 112 has an IP address of 216.10.5.5 and an associated prefix length of /32 (meaning the entire address will be looked at in determining an address space map). Using hot potato routing, ISP 110 will send all traffic from point 112 out on interface 150C. Site 250 is aware that ISP 110 uses hot potato routing. Therefore, route information collection site 250 will be able to correctly determine that point 112 is located within address space 230 of ISP 110.

If the route information collection site 250 monitors traffic using a small prefix length, there may not be enough granularity to completely resolve the address space map of ISP 110's network space. For example, assume that point 215 and point 225 are both sending equal amounts of traffic to the route information collection site 250. If site 250 collects and analyzes all incoming traffic IP addresses using a prefix length of /8, site 250 will see 50% of all 216.0.0.0 /8 traffic arriving from interface 150A, and 50% of all 216.0.0.0 /8 traffic arriving from interface 150B. The prefix length of /8 does not provide enough granularity to create an address space map of ISP 110 that can distinguish between traffic from point 215 and traffic from point 225 and select the best interface for return routing.

However, if the route information collection site 250 uses a prefix length /16 to collect and analyze the incoming traffic, a different situation results. In this case, site 250 will see 100% of all 216.100.0.0 /16 traffic arriving from interface 150A, and 100% of all 216.25.0.0 /16 traffic arriving from interface 150B. This level of granularity allows site 250 to correctly determine that the closest peering connection to point 215 (216.100.5.0) is connection 150A, and the closest peering connection to point 225 (216.25.5.1) is connection 150B.

Based upon the existing traffic flows from points 215 and 225, this is sufficient granularity for an address space map of ISP 110. The process of increasing the granularity of a traffic routing address is referred to as "route deaggregation," and this process is used to improve the accuracy of the address space map of a network.

It will be evident to one of skill in the art that if the traffic flows from ISP 110 change, the required granularity for the address space map may change as well. Furthermore, it is not necessary for an address space map to be able to resolve 100% of all "closest connection" decisions. Sufficient granularity from an operational standpoint may be achieved with a lower percentage resolution. The creation of a sufficiently detailed address space map allows for "best route" decision making, which is more accurate than relying on BGP routing information alone.

Intelligent Routing System a) Overall System Configuration

Figure 3:
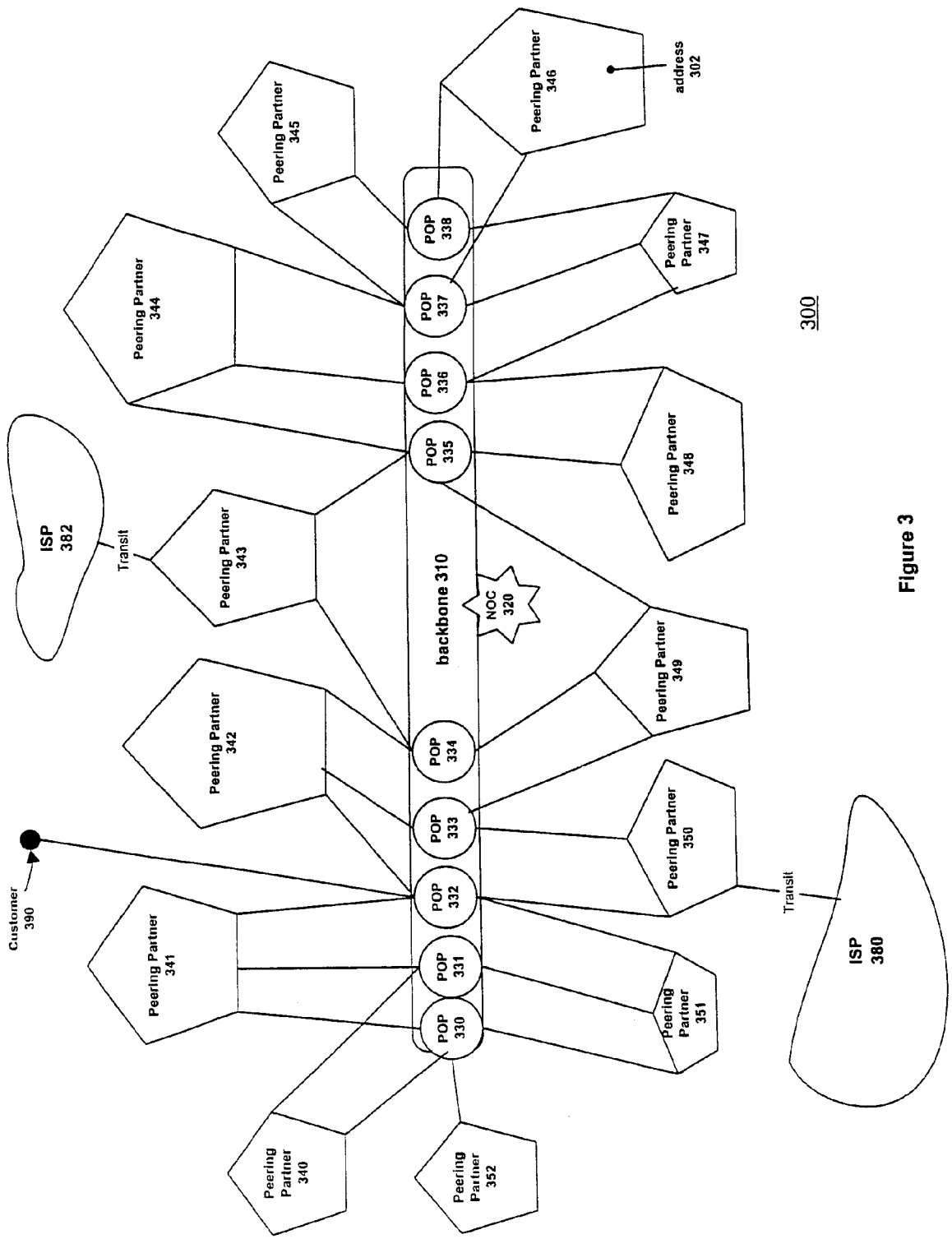
FIG. 3 is an illustration of an intelligent routing system in an embodiment of the present invention.

FIG. 3 is an illustration of an intelligent routing system in an embodiment of the present invention. The intelligent routing system 300 performs routing by developing an address space map of the system 300 and preferencing the best routes to use within the system 300. The intelligent routing system 300 consists of a backbone 310 connected to a set of peering partners 340, 341, 342, 343, 344, 345, 346, 347, 348, 349, 350, 351 and 352. Each peering partner connects to the backbone 310 through one or more Points of Presence (POPs), which are access points to the backbone. The backbone 310 also includes a Network Operations Center (NOC) 320.

The backbone 310 has nine POPs: 330, 331, 332, 333, 334, 335, 336, 337 and 338. It will be evident to one of skill in the art that the backbone 310 may contain more or fewer POPs. Each peering partner is connected to one or more POPs. Peering partner 340 is connected to POPs 330 and 331. Peering partner 341 is connected to POPs 330, 331 and 332. Peering partner 342 is connected to POPs 332, 333 and 334. Peering partner 343 is connected to POPs 334 and 335. Peering partner 344 is connected to POPs 335, 336 and 337. Peering partner 345 is connected to POPs 337 and 338. Peering partner 346 is connected to POPs 338 and 337. Peering partner 347 is connected to POPs 338, 337 and 336. Peering partner 348 is connected to POPs 336 and 335. Peering partner 349 is connected to POPs 335, 334 and 333. Peering partner 350 is connected to POPs 333 and 332. Peering partner 351 is connected to POPs 332, 331 and 330. Peering partner 352 is connected to POP 330.

The backbone 310 is a large transmission line capable of carrying large amounts of bandwidth. The intelligent routing system 300 uses the backbone 310 to carry, for example, long-haul Web traffic across geographically disparate locations. In one embodiment, the backbone 310 is a Dense Wave Division Multiplexing system (DWDM), with a capacity of 32 OCI-92 rate signal lines.

Each peering partner provides bandwidth for carrying traffic onto and off of the backbone 310. Well-connected major traffic carriers and ISPs become peering partners by contracting with the intelligent routing system 300 for the use of the system 300 network. Each peering partner will provide a certain amount of minimum bandwidth to the intelligent routing system, and may be required to connect to the backbone at a minimum number of POPs. Peering partners may consist of both US national network carriers and International network carriers.

Multiple peering partners may span the same geographical region. However, each peering partner is generally topologically independent, i.e. their network circuit destinations are independent (unless a particular IP address is multi-homed and reachable through two independent peering partner networks). Thus although peering partners may cover the same geographic region, each peering partner network is topologically independent and unique.

Each peering partner includes a set of IP addresses reachable through that particular peering partner. For example, peering partner 346 contains an address 302. In order to send network traffic to address 302, some portion of the network of peering partner 346 will be used. FIG. 3 illustrates connections between the peering partners and the backbone 310. However, it will be evident to one of skill in the art that additional connections between peering partners themselves may exist. Typically, peering partners will establish one or more peering connections between their respective networks.

One or more of the peering partners will provide a transiting connection to other portions of the Internet. These transit connections provide a link to Internet locations that are not within the intelligent routing system 300. Peering partner 343 has a transit connection to ISP 382. Peering partner 350 has a transit connection to ISP 380. It will be evident to one of skill in the art that more of fewer transit connections may be made within the intelligent routing system 300. Additionally, the intelligent routing system 300 may be implemented using other Transmission Control Protocol/Internet Protocol (TCP/IP) networks, and is not limited to Internet usage.

In one embodiment, at least four peering partners each provide a minimum of one OC-3 line connection (carrying traffic at 3 times 51.84 Mbps (millions of bits per second, or megabits per second)) to at least nine of the POPs. Additional peering partners each provide a minimum of one OC-3 line connection to at least three of the POPs. Of the set of peering partners, at least two provide transit connections to portions of the Internet or other networks that are not connected to the intelligent routing system 300. Examples of potential peering partners include companies such as Sprint™, UUNet®, and GTE™.

Each POP on the backbone 310 is an access point onto the backbone 310. Each POP has a unique IP address. The POPs are used to collect information about traffic flowing onto the backbone 310. The NOC 320 is a centralized location from which the intelligent routing system 300 is supervised and maintained. Traffic information gathered at each POP is periodically sent to the NOC, where the information is processed to develop an address space map of the intelligent routing system 300. This address space map information is used by the NOC in making intelligent "best routing" decisions for the system 300.

In order to utilize the intelligent routing system 300, a customer 390 connects via an access point to one of the POPs (POP 332 in FIG. 3). Customer 390 may connect to the access point using a number of different types of connections, such as a local connection circuit or a leased line. Customer 390 may be an individual, a corporation, or a separate ISP. A customer need only connect to the intelligent routing system 300 through a single POP in order to use the backbone 310 and each peering partner within the system 300.

In FIG. 3, each connection from a peering partner to a POP illustrates a single connection between the backbone and the ISP. In one embodiment, multiple connections may connect a peering partner to a POP site for the purpose of increasing bandwidth between the peering partner and the backbone. In a multiple connection embodiment, BGP routes are advertised concurrently and equally across the multiple connections. From the BGP routing perspective, all connections appear as equal cost paths to the ISP. Two BGP configurations are possible with multiple physical connections.

The first BGP multiple path configuration uses a separate BGP session for each physical connection. In this configuration, a routing feature is enabled, referred to as "multi-path." Normally, BGP selects a single route as the best route. Multi-path allows multiple equal cost routes learned from the same neighbor to be installed into the forwarding table. Multiple entries in the forwarding table cause the router to load balance traffic across the same-cost paths, achieving the traffic balance objective.

The second BGP multiple path configuration uses a single BGP session for all physical connections. In this configuration, the peering partner neighbor is peered with the loopback address on the peering partner's router. In addition, routes to the loopback address via each physical path are inserted into the forwarding table, typically via a static route. The result is that the backbone router receives one route from the peering partner, but the path to the route is represented by multiple physical connections. Thus the router will forward the traffic to a route via all physical connections, achieving the traffic balance objective.

b) Network Traffic Information Monitoring

Figure 4:
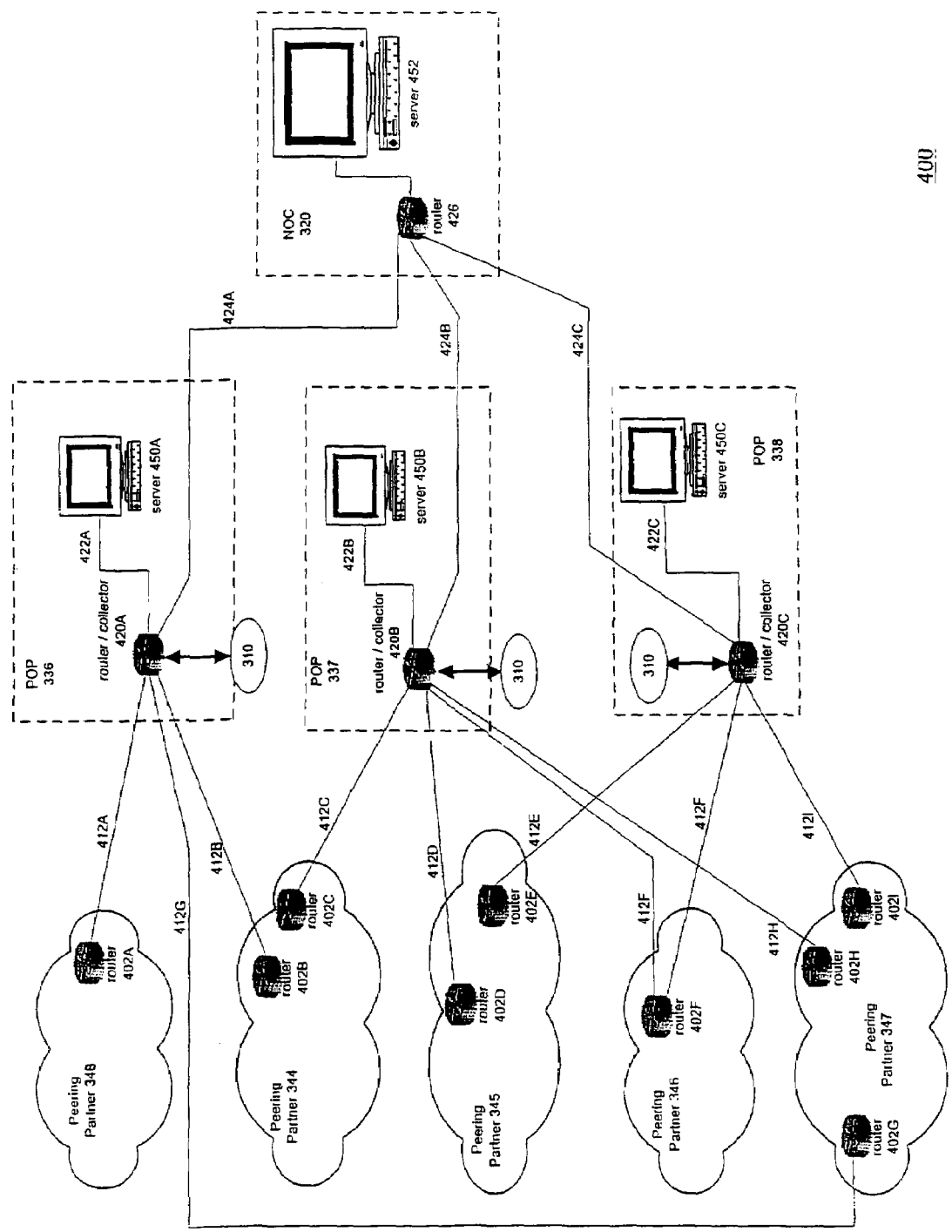
FIG. 4 is an illustration of a portion of an intelligent routing system in an embodiment of the present invention.

FIG. 4 is an illustration of a portion 400 of an intelligent routing system in an embodiment of the present invention. For clarity, the entire intelligent routing system 300 has not been shown. However, it will be evident to one of skill in the art that the portion 400 of the system shown in FIG. 4 is representative of the entire intelligent routing system 300 as a whole.

The system 400 includes a set of peering partners 348, 344, 345, 346 and 347 connected to one or more of a set of POPs 336, 337 and 338. Each POP is connected to a NOC 320 and is also connected to a backbone 310. The system 400 comprises a set of routers that interconnect to route traffic flows. The routers also pass routing information, for example, BGP route announcements, between themselves to enable each router to direct the traffic it receives. Selected routers in the system 400 also collect information on the traffic flows within the system 400 for use in performing intelligent "best route" management.

Each peering partner contains a set of routers for routing traffic within the peering partner's network. For clarity, only edge routers connecting to a POP are shown in FIG. 4. It will be understood by one of skill in the art that a peering partner may contain multiple routers. Peering partner 348 includes a router 402A connected 412A to POP 336. Peering partner 344 includes a router 402B connected 412B to POP 336, and a router 402C connected 412C to POP 337. Peering partner 345 includes a router 402D connected 412D to POP 337, and a router 402E connected 412E to POP 338. Peering partner 346 includes a router 402F connected 412F to POP 337 and POP 338. Peering partner 347 includes a router 402G connected 412G to POP 336, a router 402H connected 412H to POP 337, and a router 402I connected 412I to POP 338.

The set of connections 412 (412A-I) carry intelligent routing system traffic from the peering partners to the POPs. The set of connections 412 also carry route announcements from each peering partner to the POPs. The set of announced routes differs between peer and transit connections. Peering connections announce only "on-net" routes within the peering partner, because the entire Internet is not reachable via the peering connection. "On-net" connections are those to paying customers, and not to other peer-learned routes. Transit connections provide reachability to the entire Internet, and typically announce a full set of BGP routes.

Traffic, including route announcements, arrives at each POP via a router/collector, which performs a dual function. Each router/collector routes traffic to and from the backbone 310, and also collects information on the traffic flowing through the system. Traffic arrives at POP 336 via a router/collector 420A; traffic arrives at POP 337 via a router/collector 420B; and traffic arrives at POP 338 via a router/collector 420C.

Each router/collector 420 is a router that has been modified to monitor the traffic flowing through itself and collect IP statistics data. IP statistics data records how much network traffic is received from a particular IP address range at a particular POP from a particular peering partner. Network traffic represents the quantity of messages or signals flowing through the router/collector, and is measured both in terms of a packet count and a byte count. IP statistics data is monitored at a certain minimum prefix length set for each router/collector 420. The granularity by which addresses are monitored can be changed on each router/collector 420 by changing the minimum prefix length used. One embodiment of a router/collector 420 is a Cisco® router model GSR 12016 (Gigabit Switch Router), with the router software modified to collect the information required for the IP statistics data. In one embodiment, a modified version of the Cisco® NetFlow product is used in the collection of IP statistics data.

It will be evident to one of skill in the art that statistical data used in developing the address map may be collected on other types of network signal traffic besides IP packet traffic. An address map may be developed for a network using any number of different types of signals, for example Asynchronous Transfer Mode (ATM) signals. All of the network signal data may be monitored if desired. However, in a network with large amounts of traffic, monitoring all signals may generate cumbersome amounts of data. Alternatively, monitoring may be performed using sampling, thereby reducing the amount of data collected while still achieving an accurate database of signals sent throughout the network.

Additionally, signal traffic may be monitored for statistical data collection using several different methods for selecting which signals to measure. In one embodiment, traffic statistics for all network traffic received via peer networks are monitored. This method has high traffic sensitivity. Routing decisions will be biased towards tendencies in the traffic patterns. Therefore, the routing policies will most likely only be implemented where they will be most beneficial. Additionally, traffic statistics can be summarized solely on a per-source network basis, which reduces the statistics overhead. Finally, the traffic is passively measured, and no additional traffic is generated in order to take the statistical traffic measurements. However, address spaces that generate very little traffic will be difficult to characterize.

In another embodiment, traffic responses are actively generated throughout address spaces as necessary to supplement the existing network traffic. This method allows the gaps in the address map to be filled in where ambient network traffic is insufficient. However, this method requires an active intervention in the network and causes increased traffic bandwidth. Additionally, if the traffic is being monitored on a sampling basis, the actively generated traffic occurs in small quantities relative to the ambient network traffic. Therefore sampling may eliminate much of the desired results.

In yet another embodiment, only actively generated traffic is monitored, and traffic sent to destinations outside the intelligent routing network is not monitored. This method greatly decreases the amount of traffic monitored and therefore most likely eliminates the need to use sampling. This method can also provide an accurate view of the percentage of address spaces in particular regions since the traffic can be generated in an even distribution. However, the statistics must be summarized on both a per-source network and per-destination network basis in order to filter by destination. In this method, only the response traffic to the initiating host is measured, which adds some overhead to the statistics processing on the router. Additionally, this method may cause a loss of traffic sensitivity.

Each router/collector 420 is connected to a server 450. Router/collector 420A is connected to server 450A; router/collector 420B is connected to server 450B; and router/connector 420C is connected to server 450C. Each server 450 receives IP statistics data from the router/collector 420, and also receives the router/collector 420's route table. The route table is typically the BGP table that lists all routes received via BGP. The BGP table is a standard implementation feature of routers, and although the exact format is router vendor-specific, the BGP table typically contains the address prefix/mask, and BGP attributes for each prefix/mask. It will be understood by one of skill in the art that a route table may also include routing information learned from routing protocols other than BGP.

The server 450 performs processing on the collected IP statistics data and route table information, and prepares a periodic information update for the NOC 320. It will be understood by one of skill in the art that the tasks performed by each server 450 may alternatively be divided among multiple servers on each POP.

Periodically, each POP will send an informational update on IP statistics data and route table information to the NOC. Each POP is connected to the NOC via a connection 424 in order to provide informational updates: POP 336 is connected to the NOC 320 via connection 424A; POP 337 is connected to the NOC 320 via connection 424B; and POP 338 is connected to the NOC 320 via connection 424C.

NOC 320 receives informational updates on the IP statistics data and route table information from each POP via a router 426. The informational updates are sent to a server 452 on the NOC, which performs additional processing to develop a coherent address space map of the entire intelligent routing system to facilitate "best route" management for the system. The NOC routes centralized routing decisions back to the intelligent routing system via the POPs. The POPs then implement the "best route" management decisions of the NOC by preferencing routes within the backbone network, i.e. designating preferred routes to be used within the intelligent routing system. Deaggregated routes for IP address ranges where an increased granularity in the network address space map is desired are also injected.

In general, multiple connections into the backbone network at a single POP from a single peering partner (for example, peering partner 348 has 2 physical connections to POP 336) are treated as a single connection. Thus if preferencing is selected on a route, return traffic may use all physical connections to forward traffic to the peering partner. If de-aggregation is specified, traffic to the de-aggregated destinations will utilize all physical connections.

Once a route has been preferenced, it will be selected for use by the intelligent routing system network over other possible routes. Additionally, a deaggregated route represents a more specific route that will also be selected over other less specific routes. For example, referring back to FIG. 3, assume a preferred route exists for address 302 in peering partner 346 that uses POP 337. If a message arrives on POP 331 with a destination of address 302, the intelligent routing system network will route the message on the backbone 310 from POP 331 to POP 337, following the preferred backbone route, and then the message will be routed through peering partner 346 to address 302. The preferred route provides the intelligent routine system network routers with enough BGP information to properly perform cold-potato routing along the backbone 310.

FIGS. 5A and 5B illustrate the types of information collected by the router/collectors on each POP. FIG. 5A is an illustration of an IP statistics data table 500. The IP statistics data table 500 is used to monitor the traffic flow seen at each POP, and compile information on the amount of traffic received in each IP address range. The IP statistics data table 500 creates a separate record entry for each IP address range received at a POP, represented by an IP address and mask. Separate IP statistics data entries are also maintained for traffic arriving at different interfaces or at different POPs. The mask used on the IP address corresponds to the prefix length. The prefix length used will determine the granularity of the "bucket" used to collect IP statistics data for this IP address. The IP statistics data table 500 entries have a minimum prefix length, set at the router/collector providing the data, which sets the granularity of the addresses collected.

For example, in one embodiment, the minimum prefix length is set at /20. All IP statistics data will be collected using this address mask. The minimum prefix length may be adjusted as necessary to increase or decrease the granularity of the address space map. If, for example, the IP statistics data is collected using a /32 mask, a separate IP statistics data table 500 would be created for each individual IP address and corresponding route. This would lead to a very large table 500, and would provide the most detailed information about the network address space.

For example, assume information is sent to the POP from an IP address 140.150.16.0. If a prefix of /32 (mask 11111111.11111111.11111111.11111111) is used, the IP statistics data table 500 entry corresponds to the single individual IP address of 140.150.16.0. However, if a prefix of /8 (mask 11111111.00000000.00000000.00000000) is used, the IP statistics data table 500 entry corresponds to the range of individual IP addresses with a first quad network address of 140 (such as 140.100.16.0, 140.0.0.0, etc.).

The IP statistics data table 500 also tracks the exchange ID, which notes the POP upon which the traffic arrived. Traffic with the same IP address or address range that arrives on a different POP will be tracked separately. Initially, a separate IP statistics data table 500 is created at each POP, and therefore the exchange ID will reflect the POP where the IP statistics table 500 was generated. In one embodiment, each exchange ID is an assigned number corresponding to a particular POP.

An interface number representing a particular network connection point is also tracked for each IP statistics data table 500 entry. The interface number identifies a physical router interface connected to a particular peering partner. As IP statistics are collected, the peering partner that sent the traffic can be identified via the interface number associated with each individual IP statistics data table 500 entry. For example, a multi-homed customer may send traffic via two different peering partners. In such a case, traffic arriving from different peering partners can be distinguished by different interface numbers. In the transit connection case, the entire Internet address space is reachable via the transit interface.

The IP statistics data table 500 is used to compile statistics from the POP router/collector on the amount of traffic flowing to various parts of the intelligent routing system network. Network traffic includes the messages or signals being sent throughout the network. The byte count tracks the total number of bytes received by the router/collector for the particular IP statistics data entry (corresponding to a particular address range). The packet count tracks the total number of packets received by the router/collector for the particular entry.

The IP statistics data table 500 strength variable is a number that determines the weight to be given to the particular IP statistics data table 500 entry. The strength for a given IP address range will normally increase as more traffic is received from the particular source IP address range. The strength variables may be adjusted to vary the use of each entry in the computation of the address space map for the intelligent routing system. The strength variable will be discussed further in relation to the low pass filter threshold.

The IP statistics data table 500 pointer to associated route entry is a data memory pointer that references the corresponding route entry in the route entry table 510. The pointer will reference the most specific, or most deaggregated, corresponding IP address range in the route entry table 510. The corresponding route entry in the route entry table 510 is determined during route processing, when the IP statistics data table 500 and the route entry table 510 are correlated.

FIG. 5B is an illustration of an embodiment of a route entry table 510. Each POP creates a route entry table corresponding to the routes currently advertised at that particular POP. As additional routes are added due to route deaggregation, deleted due to route aggregation, or added or withdrawn from peering partners on the intelligent routing system network, the route table 510 entries will change. The list of entries in the route entry table 510 are taken directly from the BGP route table in each router/collector at the POP. However, additional information about each route entry is calculated after data correlation with the IP statistics data table 500 and other processing at the POP and NOC.

The route entry table 510 includes the IP address, mask, prefix length, exchange ID, and interface number for each route entry. The route entry table 510 also includes the "next hop" variable, which is the full 32 bit IP address of the next router in the route to the address range. For example, if POP 330 has a next hop address of "140.100.1.1" for the IP address range of "140.150.0.0", then in order to reach IP address range 140.150.0.0 from POP 330, the POP 330 router should send traffic to the router located at 140.100.1.1. The AS_Path in the route entry table 510 represents the AS_Path cost metric associated with the particular route. MED represents the MED cost metric associated with the particular route. IP address, mask, prefix length, exchange ID, interface number, next hop and cost metric variables are all taken from the BGP route table of each POP router/collector.

The route entry table 510 also includes a Peer ID, which is a number assigned to each peering partner connection or group of load-balanced connections. The Peer ID is calculated as part of the processing performed at each POP, based upon the next hop field and a POP configuration file that specifies the next hop associated with each peer at that POP.

A set of status flags provides information about the route and how it is being used in the best route management analysis process. Each status flag is represented bit wise in a 32-bit word. Status flags are set during data collection and route processing, as described further in regard to FIGS. 6-12. A set of exemplary status flags is given below:

| | |
|---|---|
| NO_INTERFACE | route not selected because no interface could be associated |
| COMBINED | route not selected because it was combined into another route |
| DUPLICATE | route not selected because it is a duplicate of another route |
| TRANSIT | route is a transit route |
| PREFIX_LENGTH | route not selected because of prefix length filtering |
| UNIQUE | route not selected because of unique entry filtering |
| BELOW_THRESHOLD | route not selected because its packet count was below the threshold |
| HONOR_AS | route not selected because we are honoring AS path and it violates |
| HONOR_MED | route not selected because we are honoring MEDs and it violates |
| SELECTED_NATURAL | route not selected because BGP will select it anyway |
| SELECTED_INJECT | route selected to have local preference injected |
| PREFERRED_TRANSIT | route is a transit route that is also being preferred |
| DEAGGREGATED | route is being deaggregated |
| LOW_PASS | route not selected because of low pass filtering |
| AS_EXCLUSION | route not selected because its AS path contains an excluded AS |
| LINGERING | route was not selected this iteration, but low pass filter holds it |
| PENDING_WITHDRAW | route is pending withdraw if it cannot be verified |
| WITHDRAWN | route has been withdrawn |
| MORE_SPECIFIC_PEER | route deaggregation prevented by more specific route on another peer |

Certain of these status flags will generally be set during initial data collection and consolidation. For example, the NO_INTERFACE status flag is set if an interface cannot be associated with the route. The lack of an interface association will prevent the route from being selected as a preferred route. The COMBINED, DUPLICATE, AND TRANSIT status flags are also set during initial data collection and consolidation.

Optionally, a size limit may be placed on the prefix/mask to limit the volume of injected routes that will be used. If a route is filtered out and not selected because it exceeds the maximum prefix/mask size limit, the PREFIX_LENGTH flag is set. If all routes corresponding to a particular IP address are learned via the same interface, the UNIQUE flag may be set. Routes flagged as UNIQUE may be removed from the intelligent routing calculations, because there is only one way to get to that IP address destination. In one embodiment of the intelligent routing system, the UNIQUE status flag is not used.

The status flags set during route processing are discussed later in the text corresponding to the route processing actions. It will be understood by one of skill in the art that the list of status flags given above is merely representative. More or less information may be tracked along with the entries in the route entry table 510.

The packet count and byte count fields in the route entry table 510 are added to the route entry table 510 after correlating the BGP route table from each router/collector with the IP statistics data table 500 from each router/collector. The strength field is also added during processing at each POP.

Route Processing and Selection

Figure 6:
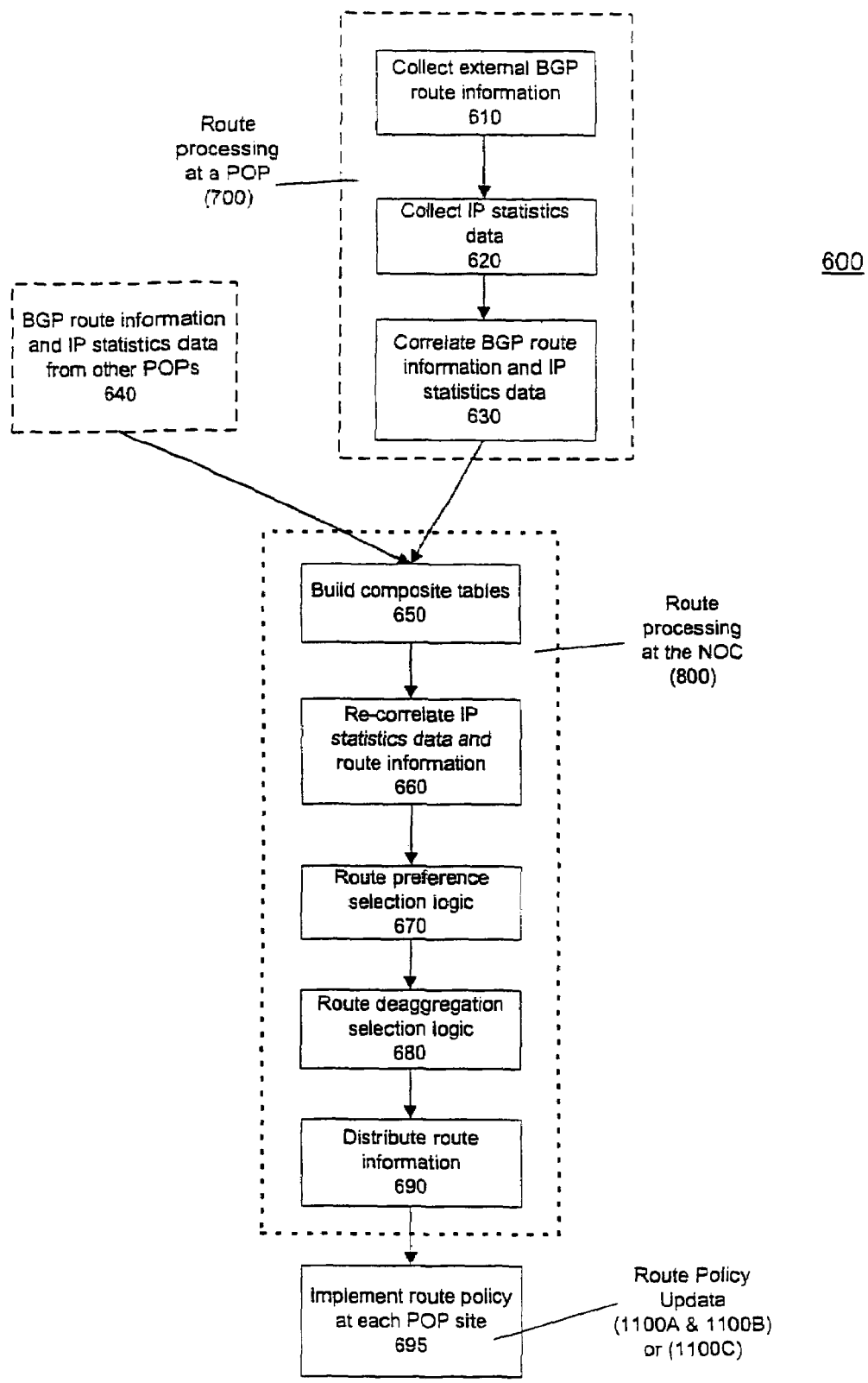
FIG. 6 is a flow diagram of the process of monitoring route information and distributing route information in an embodiment of the present invention.

FIG. 6 is a flow diagram of the overall process 600 for monitoring and distributing route information in an intelligent routing system. Route processing is performed both at each POP and at the NOC. Route processing at a POP (700) comprises steps 610-640 of process 600 (shown in more detail in FIG. 7), and route processing at the NOC (800) comprises steps 650-690 of process 600 (shown in more detail in FIG. 8). In one embodiment, the NOC is updated once per day. It will be evident to one of skill in the art that NOC updates may be performed more or less frequently.

At each POP, external BGP route information is collected 610. External BGP route information is collected from the route tables of the router/collector at each POP, as discussed previously. IP statistics data is also collected 620 at each POP, to create the IP statistics data table 500. The BGP route information and the IP statistics data are then correlated 630 to create a route entry table 510.

During correlation 630, the IP statistics data table 500 entry corresponding to each route entry table 510 entry is used to fill in the packet count and byte count fields. Where necessary, the traffic flows from multiple IP statistics data table 500 entries are combined to provide the entire packet count and byte count for a particular route entry. For example, if the IP statistics data table 500 has entries for IP address range 140.150.1.0 /24 and 140.150.30.0 /24, the packet and byte counts from these two entries are combined to correlate with the route entry table 510 IP address range of 140.150.0.0 /16, if there is no more specific route correlating to these two IP statistics address entries. Steps 610-630 are repeated at each of the POPs, as shown in step 640.

The IP statistics data table 500 and route entry table 510 from each POP are then sent to the NOC, where composite NOC IP statistics data and route entry tables are built 650. The NOC IP statistics and route entry table data is then re-correlated 660 to account for cross-POP information. The route preference selection logic 670 is implemented to preference the best routes within the backbone of the intelligent routing system network. The route deaggregation selection logic 680 is implemented to improve address space map granularity, by injecting more specific routes that will be announced to customers and thereby creating more detailed IP statistics data.

The resulting route information is then distributed 690 back to the POPs, from where it is distributed within the intelligent routing system network. Each POP has an individual exchange ID number, and each POP selects its related routes from the NOC master files using the Exchange ID field. The route information is used to implement 695 routing policy at each individual POP (as shown in one embodiment by processes 1100A and 1100B, and in another embodiment by process 1100C).

Figure 7:
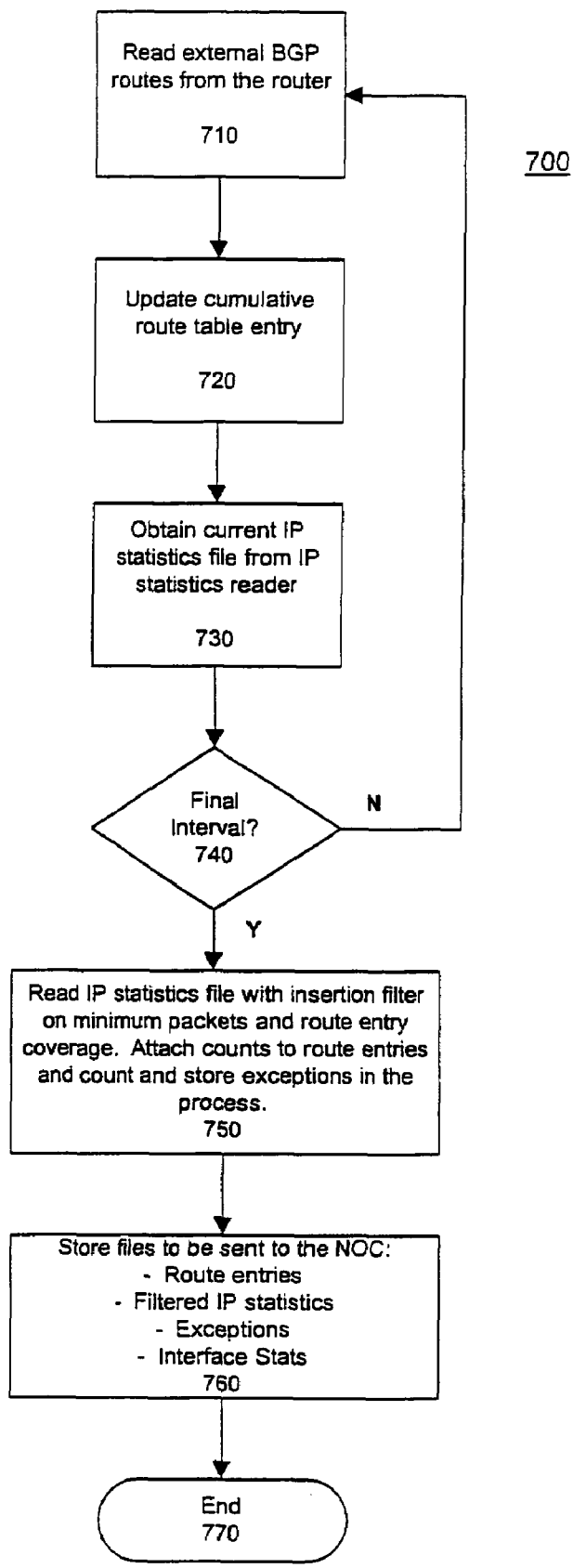
FIG. 7 is a flow diagram of route processing at the Point of Presence (POP) Collector in an embodiment of the present invention.

FIG. 7 is a more detailed flow diagram of route and traffic flow processing 700 performed at each POP. Traffic data at each POP is monitored by the router/collector and accumulated for processing in a server connected to the router/collector. Periodically, the data tables to be sent to the NOC are updated.

External BGP routes are read 710 from the router/collector. The cumulative route entry table 510 is updated 720. The current IP statistics file is obtained 730 from the IP statistics reader and stored. The IP statistics file comprises the raw traffic information read from the router/collector, and no routes are consolidated or discarded at this time. In one embodiment, the IP statistics reader is a software module configured to read traffic information reports from the router/collector and create corresponding IP statistics data table 500 entries based upon the traffic information reports.

The process 700 checks 740 to see if the final data update interval has been reached, to determine whether it is time to update the IP statistics data table 500 and the route entry table 510. If the final data update interval has not been reached, the process 700 returns to step 710 and continues to obtain route and IP statistics data. Generally, steps 710-730 will be performed multiple times per day, and step 740 will only reach the final data update interval once per day.

If the final data update interval has been reached, the process 700 proceeds to step 750 to begin processing the IP statistics data and route entry data. The raw IP statistics information is read 750 and filtered for inclusion in the IP statistics data table 500. A minimum packet count number is required to create a IP statistics data table 500 entry, in order to avoid accumulating data on little-used, spurious routes. IP statistics files listing a route that does not exist in the route entry table 510 are also filtered out and stored as exceptions. An exception, for example, could indicate a routing problem or route spoofing, and is useful in identifying hardware problems or problems within a peering partner's network. Exceptions are counted and stored in a separate file.

The IP statistics data table 500 is also correlated with the route table 510 in step 750. Packet counts and byte counts are attached to each route entry table 510 listing, using information from the IP statistics data table 500. IP statistics data table 500 entries are correlated with the most specific route table 510 listing possible.

For example, assume the following IP statistics data table 500 entry exists:

| IP ADDRESS | PREFIX LENGTH | PACKET COUNT |
|---|---|---|
| 140.150.16.0 | /20 | 100 |

Further assume the following two route table 510 listings exist:

| IP ADDRESS | PREFIX LENGTH |
|---|---|
| 140.150.0.0 | /16 |
| 140.150.16.0 | /20 |

The IP statistics packet count of 100 will be assigned only to the route table 510 listing 140.150.16.0 /20. However, if this /20 route listing did not exist, the IP statistics packet count of 100 would then be assigned to route listing 140.150.0.0/16 as the most specific existing route corresponding to the IP statistics entry of interest.

Files are stored 760 in preparation for sending an update to the NOC. The stored files include the filtered IP statistics comprising the IP statistics data table 500, the route entry table 510, an exceptions file, and an interface statistics file identifying the number of exceptions per interface. The interface statistics file is useful in identifying peering partners with particular problems. The route processing at the POP then ends 770. The POP data is now ready to be sent to the NOC.

Figure 8:
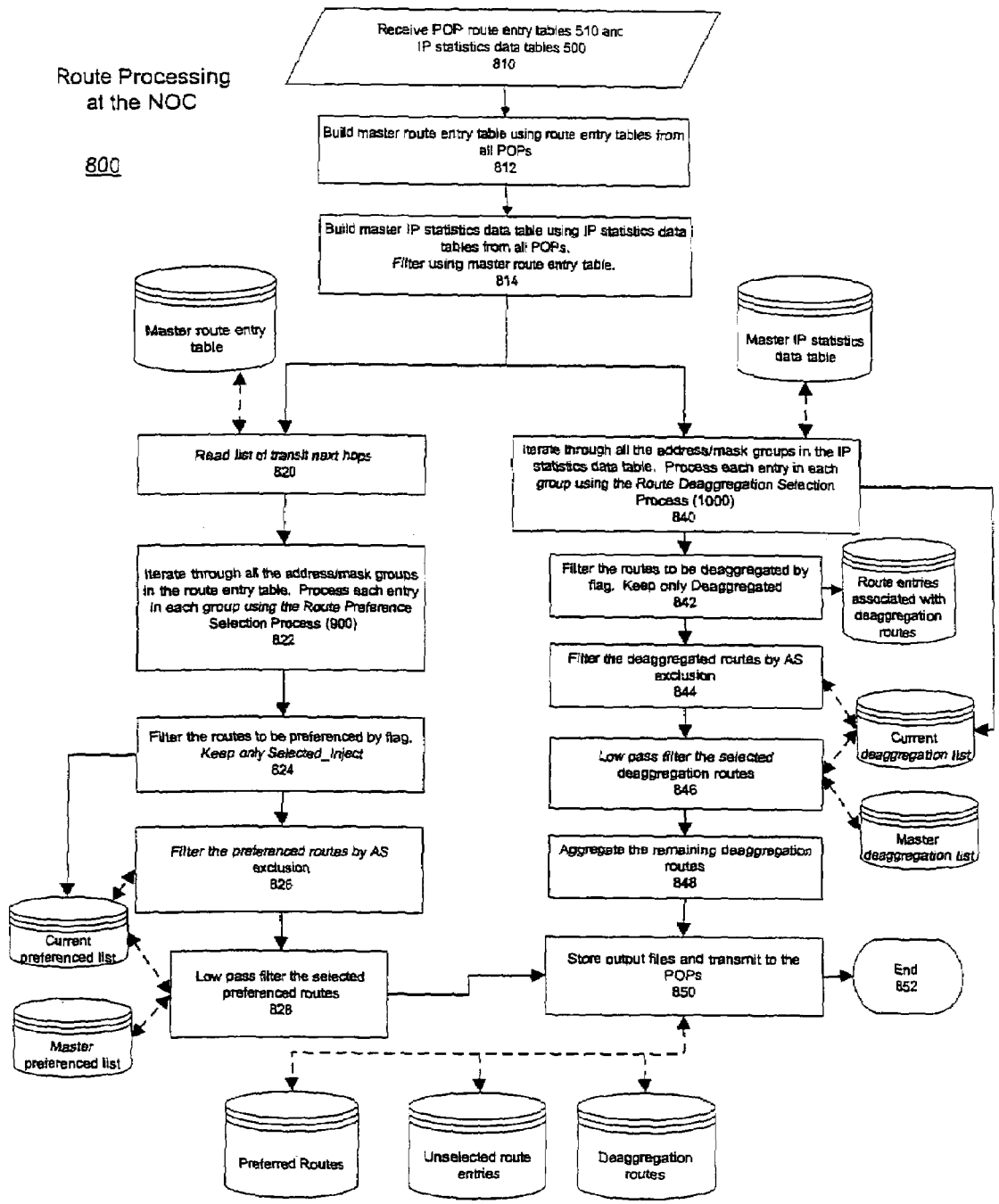
FIG. 8 is a flow diagram of the route processing at the Network Operations Center (NOC) in an embodiment of the present invention.

FIG. 8 is a more detailed flow diagram of route and traffic flow processing 800 performed at the NOC. Data collected from each POP is analyzed in order to identify network routes that should be preferenced and routes that should be deaggregated in order to gain additional intelligent routing system address space map information.

The NOC receives 810 route entry tables 510 and IP statistics data tables 500 from each POP. The NOC builds 812 a master route entry table 510 using the data from each POP. The NOC then builds 814 a master IP statistics data table 500 using the individual IP statistics data tables from each POP. The master IP statistics data table 500 filters out IP statistics files listing a route that does not exist in the global route entry table 510. The master IP statistics data table 500's pointer to associated route entry is altered to point to the global route entry table 510.

Processing next proceeds using the master route entry table 510 in steps 820-828, and using the master IP statistics data table 500 in steps 840-848. The master IP statistics data table 500 processing (steps 840-848) uses information from the master route entry table 510 created in step 822. Thus processing steps may proceed in several different orders after steps 820 and 822 have been performed. In one embodiment, processing using the master IP statistics data table 500 (steps 820-828) requiring information from the master route entry table 510 as it exists after step 822 is performed first, before completing processing steps 824-828 on the master route entry table 510. In this embodiment, the steps are performed in the following order: steps 810-822, steps 840-848, and then steps 824-828, followed by steps 850 and 852.

In another embodiment, a copy of the original master route entry table 510 of step 822 is created to use in processing the master IP statistics data table 500 (steps 840-848), while processing proceeds on the master route entry table 510 (steps 824-828). This allows some parallel processing to be performed. After steps 810-822 are performed, steps 824-828 and steps 840-848 are performed at least partially in parallel, followed by steps 850 and 852.

Steps 820, 822, 824, 826 and 828 involve processing on the master route entry table 510. The NOC reads 820 the list of all transit next hops in order to identify inefficiencies in peering partner routing. The route entry table 510's BGP routing information identifies the origination of routes and what networks the routes passed through. Given the list of transit next hops, the NOC will be able to identify, for example, that a first peering partner is using a second peering partner to access the backbone. Identifying such routing inefficiencies by the peering partners allows the intelligent routing system to work with the inefficient peering partner to troubleshoot the inefficiencies.

Figure 9:
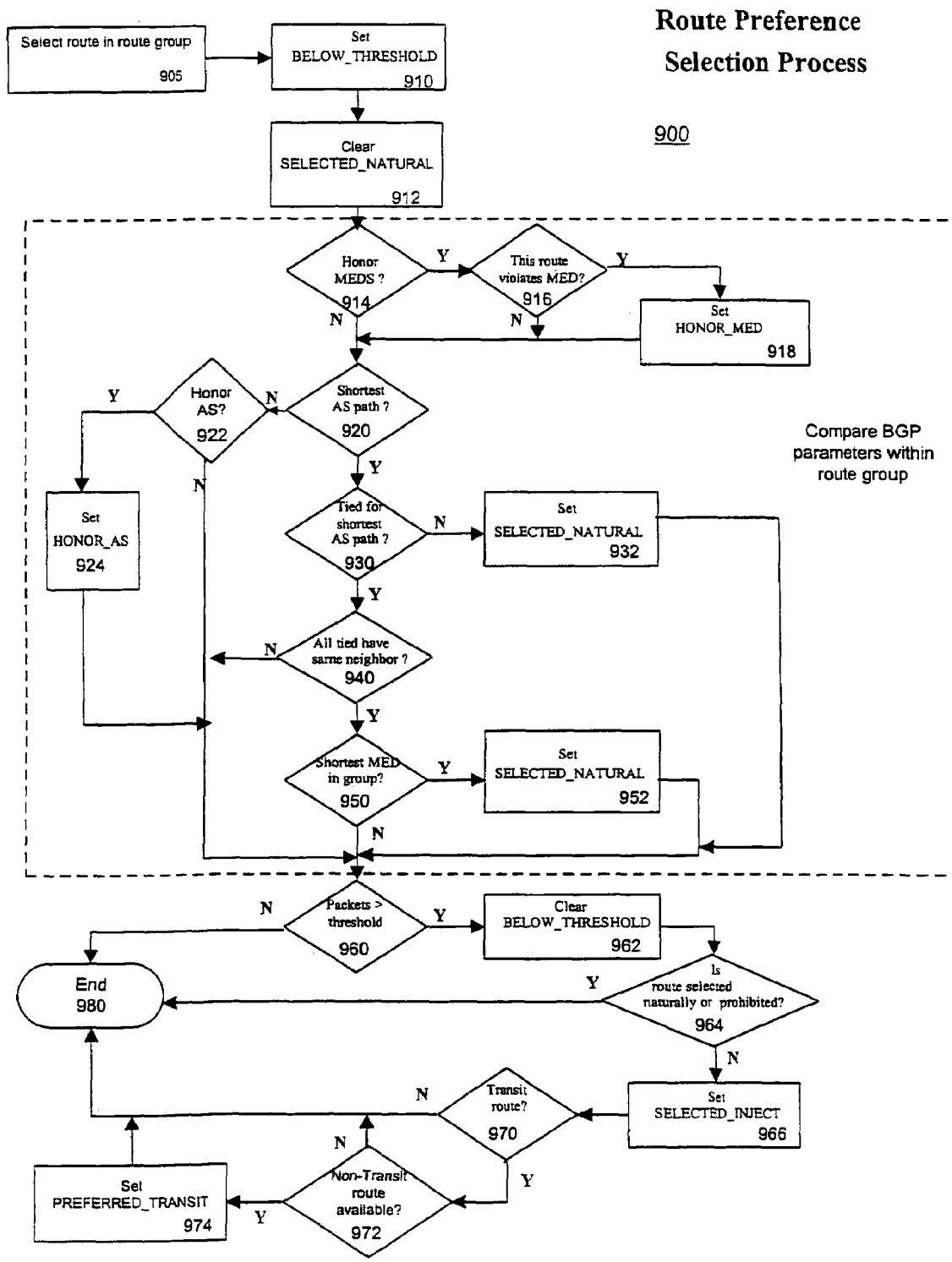
FIG. 9 is a flow diagram of the route preferencing selection process in an embodiment of the present invention.

The NOC then iterates 822 through all of the IP address range listings in the route entry table 510 and processes each listing according to the route preferencing selection process 900 described in FIG. 9. The route preferencing selection process 900 groups each set of routes corresponding to the same IP address and mask. The preferencing process 900 compares the attributes of each route in a group, and preferences the best route to use for a particular IP address and mask.

For example, in FIG. 5B, three different routes are listed in the route entry table 510 corresponding to the same IP address (140.150.0.0) and mask (/16 prefix length). These three routes comprise a route group. The three routes within the route group have different attributes, such as AS_Path, MED, and packet count. The route preference selection process will select, if possible, a preferred route from among the three separate routes in the route group by setting selected status flags within the master route entry table 510.

The master route entry table 510 routes are filtered 824 by status flag. Only those routes whose "SELECTED_INJECT"

status flag has been activated are saved as a "current preferenced routes" list. These preferenced routes are the routes designated to be injected into the intelligent routing system network as preferred backbone routes.

The preferenced routes are then filtered 826 by AS exclusion. The AS_EXCLUSION status flag is set if a peering partner specifically requests that the routes they advertise be left alone and not changed. In this way a peering partner is able to fix certain routes if it so desires, and the intelligent routing system will not change these routes. Filtered routes are removed from the current preferenced route list.

The current preferenced routes are then low pass filtered 828. The low pass filter step 828 helps eliminate noise from intermittent ISP topology changes or route flapping by filtering out routes that are unstable or transient. A master preferenced list is maintained of all previously preferenced routes. The current preferenced routes list is checked against the master preferenced routes list. Routes appearing in the current list that do not appear in the master list are added to the master list and given a relatively low strength value. Routes appearing in the current list that also appear in the master list will have their strength value in the master list increased in value. Routes appearing in the master list that do not appear in the current list will have their strength value in the master list decreased in value. In one embodiment, the strength value varies between 0 and 1. Only preferenced routes with strength above a certain threshold will be passed on to step 850 in the "preferred routes" output file. The low pass threshold may be altered, for example, to increase or decrease the time required for route preferencing to change in response to new routes on the intelligent routing system. Routes not selected because of low pass filtering will have their LOW_PASS status flag set. The LINGERING status flag is also set, if applicable, to indicate that even though the route was not present in the current preferenced route list, the route is still included in the "preferred routes" output file after low pass filtering.

Steps 840, 842, 844, 846 and 848 involve processing on the entries in the master IP statistics data table 500. The NOC iterates through all of the entries in the master IP statistics data table 500 and processes 840 each entry according to the route deaggregation selection process 1000 described in FIG. 10. The route deaggregation selection process 1000 groups each set of IP statistics data table 500 entries corresponding to different routes for the same IP address range, similar to the grouping of route table 510 entries. IP statistics entries that are not to be used as deaggregation routes are filtered out and deleted from the table, to create a current deaggregation list. During the route deaggregation selection process 1000, certain parent routes associated with IP statistics entries selected for deaggregation will have their DEAGGREGATED status flag set. The route table entries are filtered 842 on the DEAGGREGATED status flag, and the routes marked DEAGGREGATED are used to create the "route entries associated with deaggregation routes" output file.

The NOC takes the current deaggregation list and the route entries associated with deaggregation routes file and filters 844 the list of routes to be deaggregated by the AS_EXCLUSION status flag, similar to the filtering performed in step 826.

The NOC then low pass filters 846 the deaggregation list and associated route entries file, similar to the filtering performed in step 828. The low pass filter step helps eliminate noise from topology changes or route flapping. The strength variable reflects whether routes on the current deaggregation list have appeared on previous deaggregation lists. A master deaggregation list is maintained of all previously deaggregated routes. The current deaggregation list is checked against the master deaggregation list. Routes appearing in the current list that do not appear in the master list are added to the master list and given a relatively low strength value. Routes appearing in the current list that also appear in the master list will have their strength value in the master list increased in value. Routes appearing in the master list that do not appear in the current list will have their strength value in the master list decreased in value. In one embodiment, the strength value varies between 0 and 1. Only deaggregation routes with strength above a certain threshold will be passed on to step 848 in the "deaggregation routes" output file. Routes that are not selected because of low pass filtering will have the LOW_PASS status flag set.

The routes remaining in the deaggregation routes output file are aggregated 848 where it is possible to collapse a set of address groups into a larger address range. For example, assume the minimum prefix length for the IP statistics is /20. If four /20 address entries marked for deaggregation reference the same route, this demonstrates that the four different /20 addresses are located close together in the topological address space map of the intelligent routing system network. In such a case, it is more efficient to aggregate these four different /20 deaggregation routes into, for example, a single /18 deaggregation route. Aggregation is done for efficiency to avoid unnecessarily increasing the size of the routing tables.

Selected output files are stored and transmitted to the POPs in step 850. The selected output files are the preferred routes file, the deaggregation routes file, and the unselected route entries. The NOC processing then ends 852.

FIG. 9 is a flow diagram of the route preference selection process 900. The route preference selection process 900 selects routes from the master route entry table 510 to be preferenced within the intelligent routing system network as preferred backbone routes. The route preference selection process 900 groups each set of routes from the master route entry table corresponding to the same address range, i.e. the same IP address and mask. Each route group is processed together, with comparisons made within the group to determine if the best route will be selected naturally or if the best route should be preferenced in order to ensure that the best route will be selected.

The route preference selection process 900 selects a route group, and processes through each individual route entry in the group. The process 900 then proceeds to select a next route group and repeats the cycle until no more unprocessed route groups remain.

An administrator at the NOC influences process 900 by setting certain network configuration parameters. These network configuration parameters determine whether the NOC route preference selection process 900 will mandate that the AS_Path and MED BGP parameters be honored in determining whether to preference a route. In one embodiment, the MED and AS_Path attributes are not guaranteed to be honored, which allows the intelligent routing system to make routing decisions at the NOC regardless of the preferred route suggestions made by peering partners.

A first route within a first route group is selected 905. The BELOW_THRESHOLD status flag is set 910. This status flag will be cleared later in the process 900 if it is determined that there are enough packets associated with the route of interest to warrant preferencing the route. The SELECTED_NATURAL status flag is cleared 912. The SELECTED_NATURAL status flag indicates whether its associated route will be selected naturally by BGP. In steps 914-952, the MED and AS_Path BGP parameters are compared within a route group to determine whether the "best" route within the group will be selected naturally, or whether the best route should be preferenced in order to be selected.

The process checks 914 to see if MEDs are mandated to be honored. The decision of whether or not to mandate honoring the announced routes MED attribute is determined by an administrator at the NOC who sets the honor MED network configuration parameter. If MEDs are not mandatorily honored, the process proceeds to step 920. If MEDs must be honored, the process checks 916 to see if the first selected route violates MEDs. If MEDs are not violated, the process proceeds to step 920. However, if the route will violate MEDs, the process proceeds to set 918 the HONOR_MED status flag to flag that this route is prohibited because it violates MEDs and the system has chosen to honor MEDs. The process then proceeds to step 920.

The process determines 920 whether the route of interest has the shortest AS_Path within its route group. If the route of interest does not have the shortest AS_Path, the process proceeds to determine 922 whether it is mandatory to honor the AS_Path attribute in the intelligent routing system. The decision of whether or not to mandate honoring the announced route's AS_Path attribute is determined by an administrator at the NOC who sets the honor AS_Path network configuration parameter. If AS_Path must be honored, the HONOR_AS status flag is set 924, thereby flagging that this route is prohibited, and the process proceeds to step 960. If the AS_Path attribute is not mandated to be honored, the process continues to step 960.

If in 920 the route of interest is determined to have the shortest AS_Path within its route group, the process checks 930 to determine if the route of interest is tied for the shortest AS_Path with another route in the route group. If not, the SELECTED_NATURAL status flag is set 932, and the process continues to step 960. If the route of interest is tied with another route within the route group for the shortest AS_Path, the process checks 940 to determine if all the routes that are tied, for shortest AS_Path have the same neighbor. The "same neighbor" check determines if the routes tied for shortest AS_Path are from the same peering partner. The MEDs attribute is an attribute that is local to a particular AS (autonomous system), or peering partner. Only routes from the same peering partner can make a valid MEDs comparison.

If all of the routes tied for the shortest AS_Path do not have the same neighbor, a MED comparison would be invalid, and thus the process continues to step 960. If all of the routes do have the same neighbor, the process checks 950 to determine if the route of interest has the shortest MED in the route group. If yes, the SELECTED_NATURAL status flag is set 952, and the process continues to step 960. If the route of interest does not have the shortest MED in the route group, the process continues directly to step 960.

In step 960, the process determines whether the amount of traffic associated with the route of interest exceeds a preferencing threshold. The preferencing threshold is determined at the NOC, and is used to prevent routes with very little traffic from being preferenced. The preferencing threshold may be altered to preference more or fewer routes, and in one embodiment is set in terms of a percentage of total traffic from a particular route group (measured in packets or bytes). In one embodiment, a threshold of at least 50% of all collected traffic data from a route group is set initially, and the preferencing threshold is altered as required.

If the preferencing threshold is not exceeded, the process ends 980 because there are not enough packets associated with the route to justify preferencing the route. However, if the preferencing threshold is exceeded, the BELOW_THRESHOLD status flag is cleared 962. The process then checks 964 to see if the route is selected naturally or prohibited. Routes that will be selected naturally do not need to be preferenced; these routes will have the "SELECTED_NATURAL" status flag set during the route preference selection process. Routes that are prohibited should not be selected. Prohibited routes are those for which the "HONOR_MED" or "HONOR_AS" status flags have been set.

If the route is selected naturally or prohibited, the process ends 980. However, if the route is not selected naturally and is not prohibited, the SELECTED_INJECT status flag is set 966. The process then checks 970 to determine whether the route of interest represents a transit route. If the route is not a transit route, the process ends 980. However, if the route is a transit route, a check 972 is performed to determine if a non-transit route is available.

If a non-transit route is not available, the process ends 980. However, if a non-transit route is available, the PREFERRED_TRANSIT status flag is set 974. The process then ends 980.

The route preference selection process will then choose the next route in the route group to process. After all of the routes in the first route group have been processed, the next route group is selected for processing. After all of the route groups have been processed, the route preference selection process ends for the current NOC update cycle.

Figure 10:
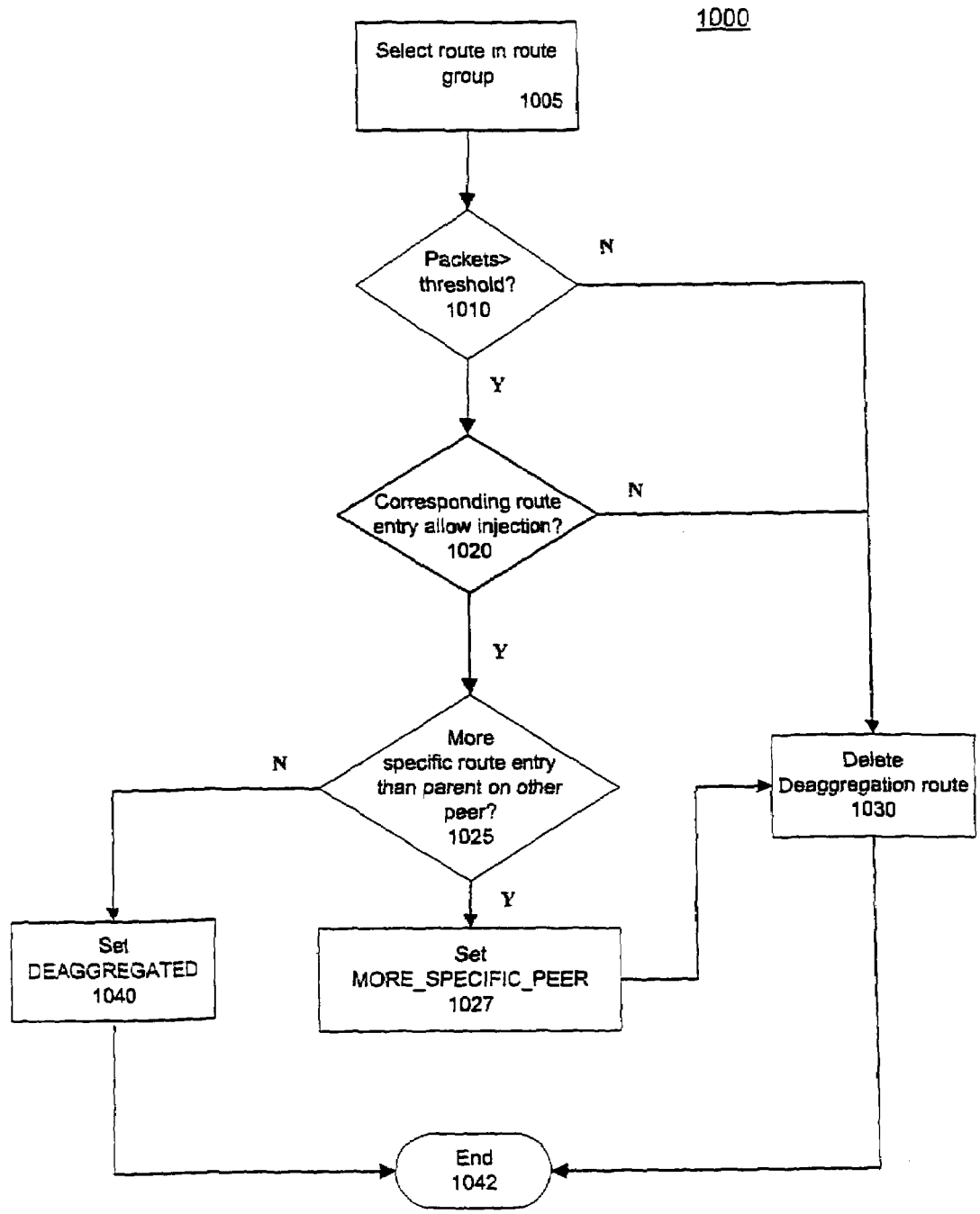
FIG. 10 is a flow diagram of the route deaggregation selection process in an embodiment of the present invention.

FIG. 10 is a flow diagram of a route deaggregation selection process. A route deaggregation selection process 1000 selects routes from the master IP statistics data table 500 to be injected into the intelligent routing system network as deaggregation routes. These deaggregation routes will increase the size of the route tables used for the intelligent routing system network. The deaggregation routes increase the granularity of the destination paths across the set of ISP connections. The route deaggregation selection process groups each set of routes from the master IP statistics data table 500 corresponding to the same IP address and mask.

The route deaggregation selection process selects a first route from a first route group 1005. The process checks 1010 to see if the number of packets associated with the route exceeds a deaggregation threshold. The deaggregation threshold is not directly related to the preferencing threshold. In one embodiment, the deaggregation threshold is set in terms of a percentage of total traffic from a particular route group. For example, if the deaggregation threshold is set at 75%, a particular route must represent more than 75% of all the traffic from a route group in order to exceed the threshold. The deaggregation threshold may be varied by the NOC operator to select more or fewer routes.

If the deaggregation threshold is not exceeded, the deaggregation route is deleted 1030 and the process ends 1042. If the deaggregation threshold is exceeded, the process checks 1020 to see if the corresponding route entry allows injection. Routes that are prohibited may not be injected. In particular, prohibited routes are those for which the "HONOR_MED" or "HONOR_AS" status flags have been set (as determined by the network configuration parameters set at the NOC). If route injection is not allowed, the deaggregation route is deleted 1030 and the process ends 1042.

If route injection is allowed, there is one more condition to satisfy before selecting the route for deaggregation. It is possible that a routing scenario may occur where a more specific route entry than the corresponding route entry to the candidate deaggregation route exists on another peering partner. If the more specific route entry on the other peering partner also happens to be less specific than the deaggregation route and contains the address range of the deaggregation route, then it would be incorrect to inject the deaggregation route with the attributes of the original corresponding route entry.

Thus if the corresponding route entry allows injection, a check is performed 1025 to determine if a more specific route entry than the parent route exists on another peering partner. If this scenario occurs, the MORE_SPECIFIC_PEER flag is set 1027 on the corresponding route entry and the deaggregation route is deleted. The process then ends 1042. Otherwise, if a more specific route does not exist, the DEAGGREGATED status flag is set 1040 in the associated route table 510 (for filtering purposes and post-analysis), and the process ends 1042. The next route from the first route group will be selected, and the route deaggregation process will continue until all of the route groups have been processed. After all of the route groups have been processed, the route deaggregation selection process 1000 ends for the current NOC update cycle.

As shown in FIG. 8, step 850, once the processing at the NOC has been completed, the stored output files are transmitted to the POPs. The POPs each receive the new NOC output file listings of: preferred routes, unselected route entries, deaggregation routes, and route entries associated with the deaggregation routes.

Best-Route Implementation

The lists of preferred and deaggregation routes are implemented in the intelligent routing system network through route processing at each POP. In one embodiment, shown in FIGS. 11A and 11B, periodic route processing 1100A is used to implement new updates from the NOC, and continuous route processing 1100B is used to manage the deaggregated routes in response to BGP announcements and withdrawals received from the external BGP peers. This is necessary because the validity of a deaggregated route is tied to the current availability of the "parent" route entry. In another embodiment, a single process 1100C is used to implement route processing following a NOC update. This approach requires that the router is capable of explicitly accepting the associations between the deaggregated routes and the "parent" entries and can manage the deaggregated routes internally.

Figure 11A:
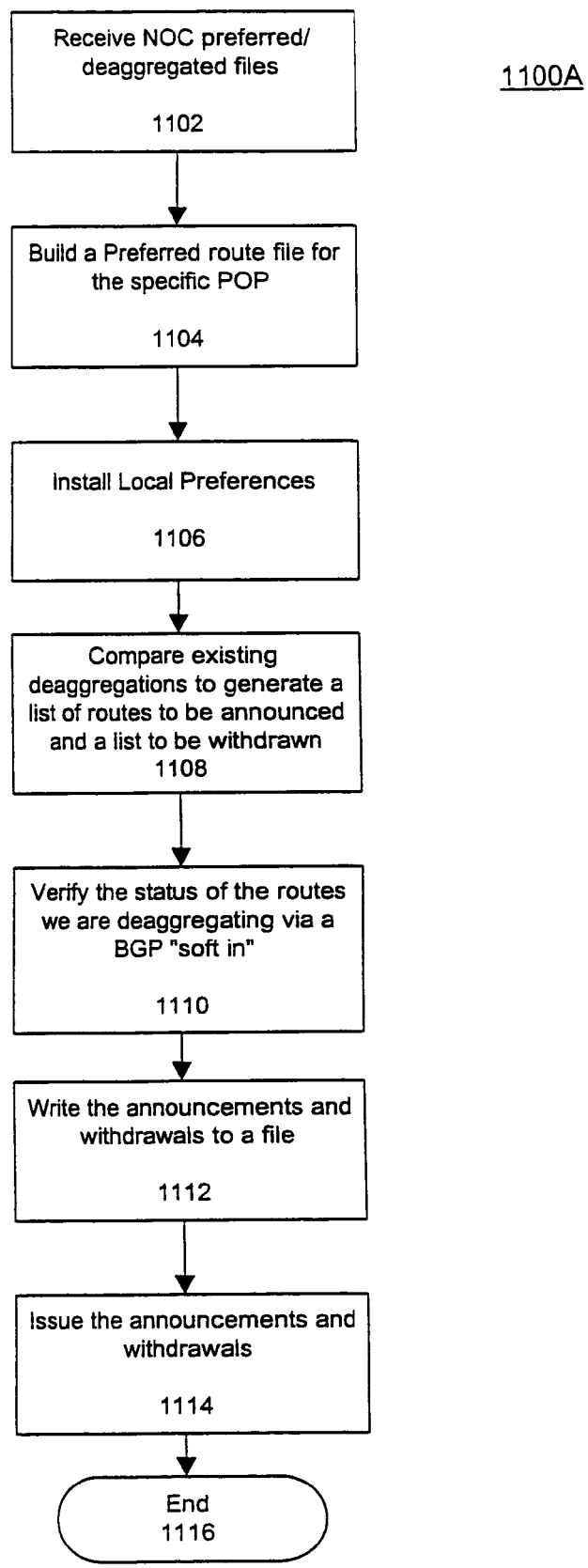
FIG. 11A is a flow diagram of periodic route processing at the POP injector in an embodiment of the present invention.

FIG. 11A is a flow diagram of periodic route processing 1100A at the POP injector. Each POP injector consists of software configured to preference routes within the backbone network or inject deaggregated routes that will be announced to the customer. Each POP includes a software route injection module including a BGP speaker and listener program, which provides a mechanism for monitoring routing information sent from a peer, and allows the injection of routing information into a peering session. Each POP separately performs the steps shown in FIG. 11A. Each POP receives 1102 the NOC preferred routes and deaggregation routes files, along with the route entries associated with the deaggregation routes. A preferred route file is built 1104 for the specific POP performing the processing. Specific preferences are those preferences relating to the POP performing the processing. The specific POP is indicated via the Exchange ID listing associated with each preferred or deaggregated route.

Local preferences are installed 1106. "Local preference" is a BGP parameter that indicates priority in a network. A lower local preferences value indicates a lower priority in the network. BGP local preferences take precedence over AS_Path and MED values. Preferenced routes are given a high priority local preference to favor that specific route within the backbone network. In one embodiment, injected deaggregated routes are installed with low priority local preferences so that if a route entry of the same mask length is announced from a peering partner, the peering partner-learned route will supercede the injected route.

Existing deaggregation routes at the POP are compared 1108 with the newly received list of deaggregation routes from the NOC. The comparison produces an updated list of routes to be announced and routes to be withdrawn. Routes found on both the old and new lists of deaggregation routes have not changed, so they are neither announced nor withdrawn. Routes found on the old list but not on the new list are withdrawn, whereas routes found on the new list but not on the old list are added to the list of routes to be announced. The PENDING_WITHDRAW status flag is set to temporarily mark a route to be withdrawn as "not yet validated."

The status of the routes to be deaggregated is verified 1110 via a BGP "soft reconfiguration inbound" ("soft in"), which checks to ensure that a route that is to be preferenced or deaggregated still exists. A BGP "soft in" resends a full set of routes from the peering partner that originally sent the route to be verified, therefore, there is no danger of missing a route. A "soft in" BGP check is desirable because there is a time delay between receiving and analyzing the data associated with a route, and preferencing or deaggregating that same route. During this time interval, it is possible that the route has been withdrawn. If a BGP "soft in" check verifies the route, the PENDING_WITHDRAW status flag is removed. The PENDING_WITHDRAW status flag is replaced by the WITHDRAWN status flag if the route remains unverified.

The routes to be announced and the routes to be withdrawn are written 1112 to a file in BGP session software format, for example, SBGP (Simple BGP) format. The route announcements and withdrawals are then issued 1114 via a BGP session on an external system dedicated to managing the router. The process then ends 1116. The periodic route processing at the NOC will repeat at each POP each time an update of preferred and deaggregated routes is received from the NOC.

Figure 11B:
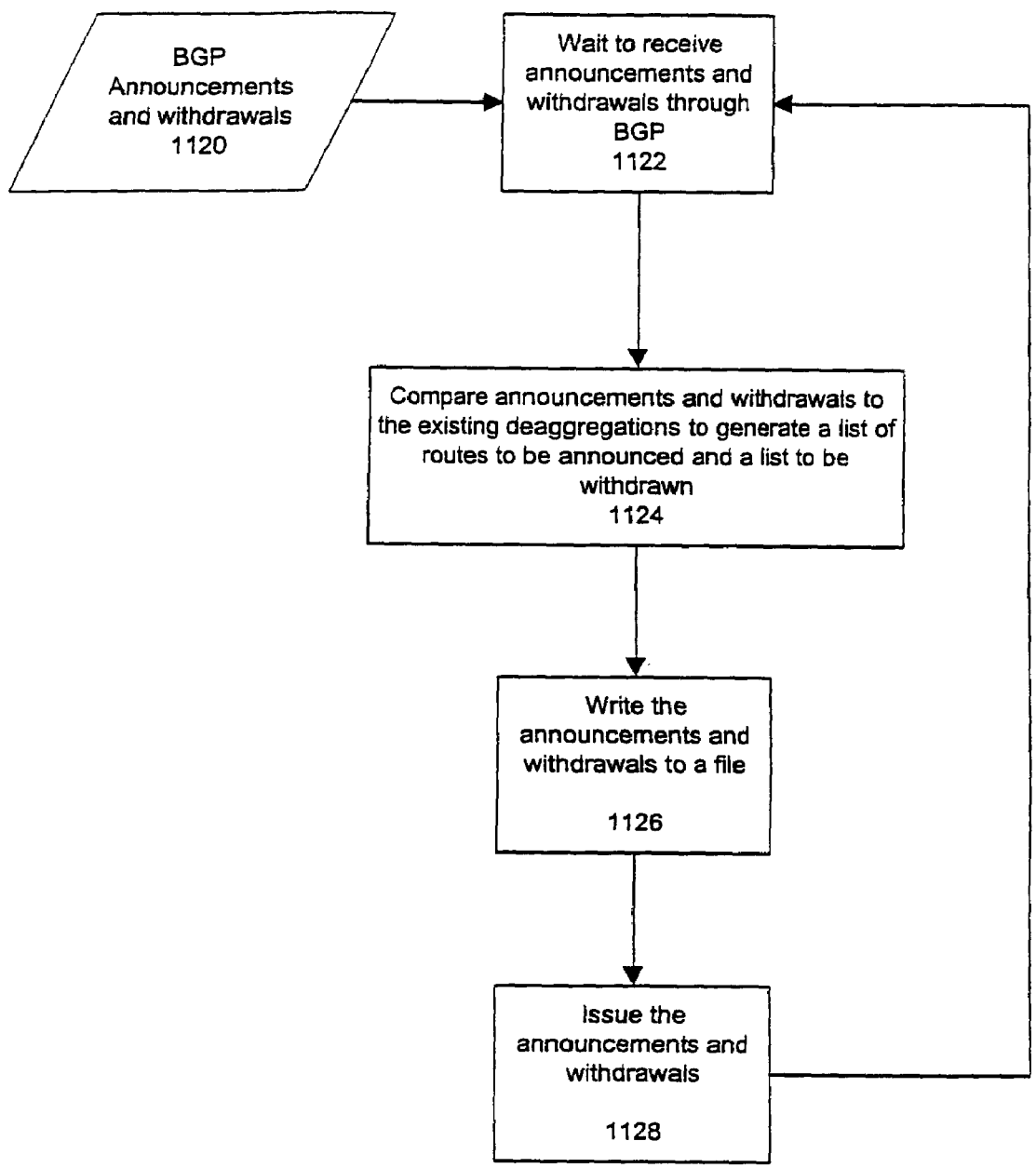
FIG. 11B is a flow diagram of continuous route processing at the POP injector in an embodiment of the present invention.

FIG. 11B is a flow diagram of continuous route processing 1100B that occurs at each POP injector. The continuous route processing is an ongoing process that does not depend on receiving a NOC route update. The POP injector waits 1120 to receive route announcements and withdrawals through BGP. When a BGP announcements and withdrawals message 1122 is received, the process compares 1124 the received announcements and withdrawals to the existing list of route deaggregations. A new list of routes to be announced and withdrawn is generated from the comparison.

The new list of announcements and withdrawals is written 1126 to a file in BGP session software format, and the announcements and withdrawals are then issued 1128 via a BGP session. The process then returns to step 1122 and waits to receive another BGP message.

Figure 11C:
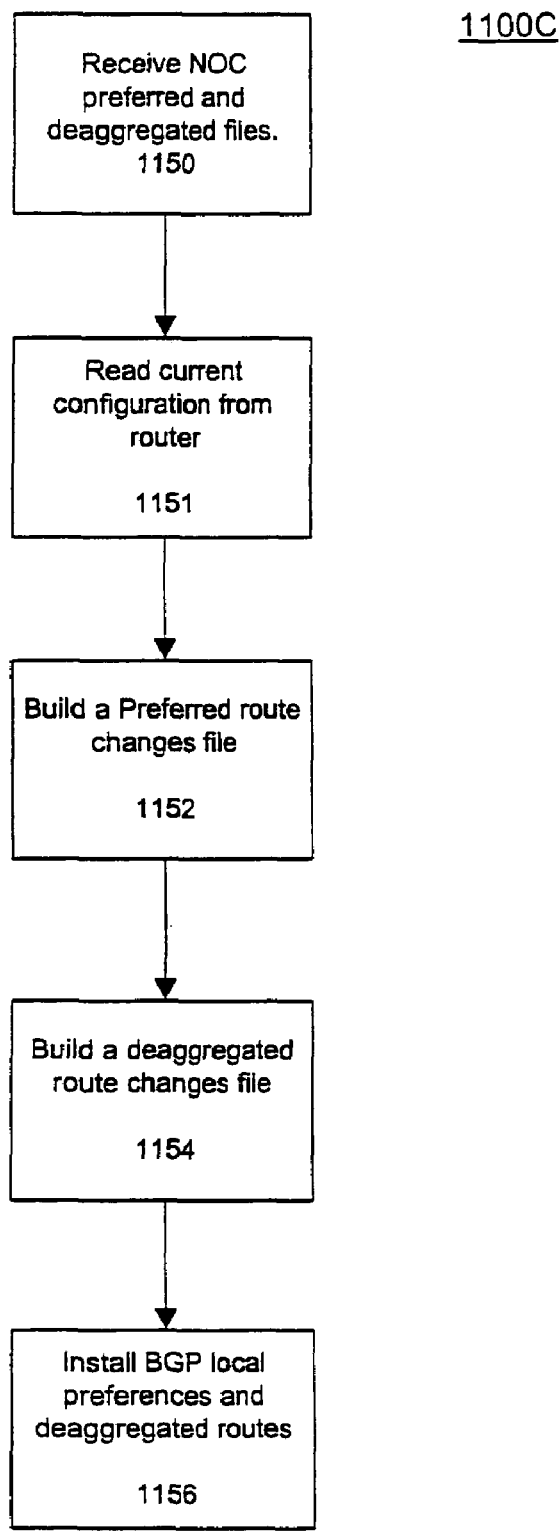
FIG. 11C is a flow diagram of route processing at the POP injector in another embodiment of the present invention.

FIG. 11C is a flow diagram of another embodiment of route processing 1100C at the POP injector. Each POP injector consists of software configured to preference routes within the backbone network or inject deaggregated routes that will be announced to the customer. Each POP includes a software route injection module including remote shell scripts that provide a mechanism for verifying the current configuration of the router, and allowing the installation of route preferences and deaggregated routes. Each POP separately performs the steps shown in FIG. 11C. Each POP receives 1150 the NOC preferred routes and deaggregation routes files, along with the route entries associated with the deaggregation routes.

In one embodiment, a remote shell script retrieves the current list of preferred and deaggregation routes from the router 1151. The current preferred routes are compared to the latest preferred routes from the NOC. This results in a list of new routes to preference and a list of routes to no longer preference. A preferred route changes file is built 1152 to provide the necessary commands to the router to implement these changes. The current deaggregation routes are compared to the latest deaggregation routes from the NOC. This results in a list of new routes to deaggregate and a list of routes to no longer deaggregate. A deaggregation route changes file is built 1154 to provide the necessary commands to the router to implement these changes.

In one embodiment, a remote shell script installs the BGP local preferences and deaggregation routes 1156 contained in the change files. The method of FIG. 11C uses a specialized router that associates injected routes with a parent prefix. The router software will: (1) match an injected route to a parent route; (2) inject more specific prefixes for matching a parent prefix; (3) copy all BGP attributes from parent to injected route; and (4) insert or remove injected routes based upon the availability of the parent route.

Information and Processing Flows

Figure 12:
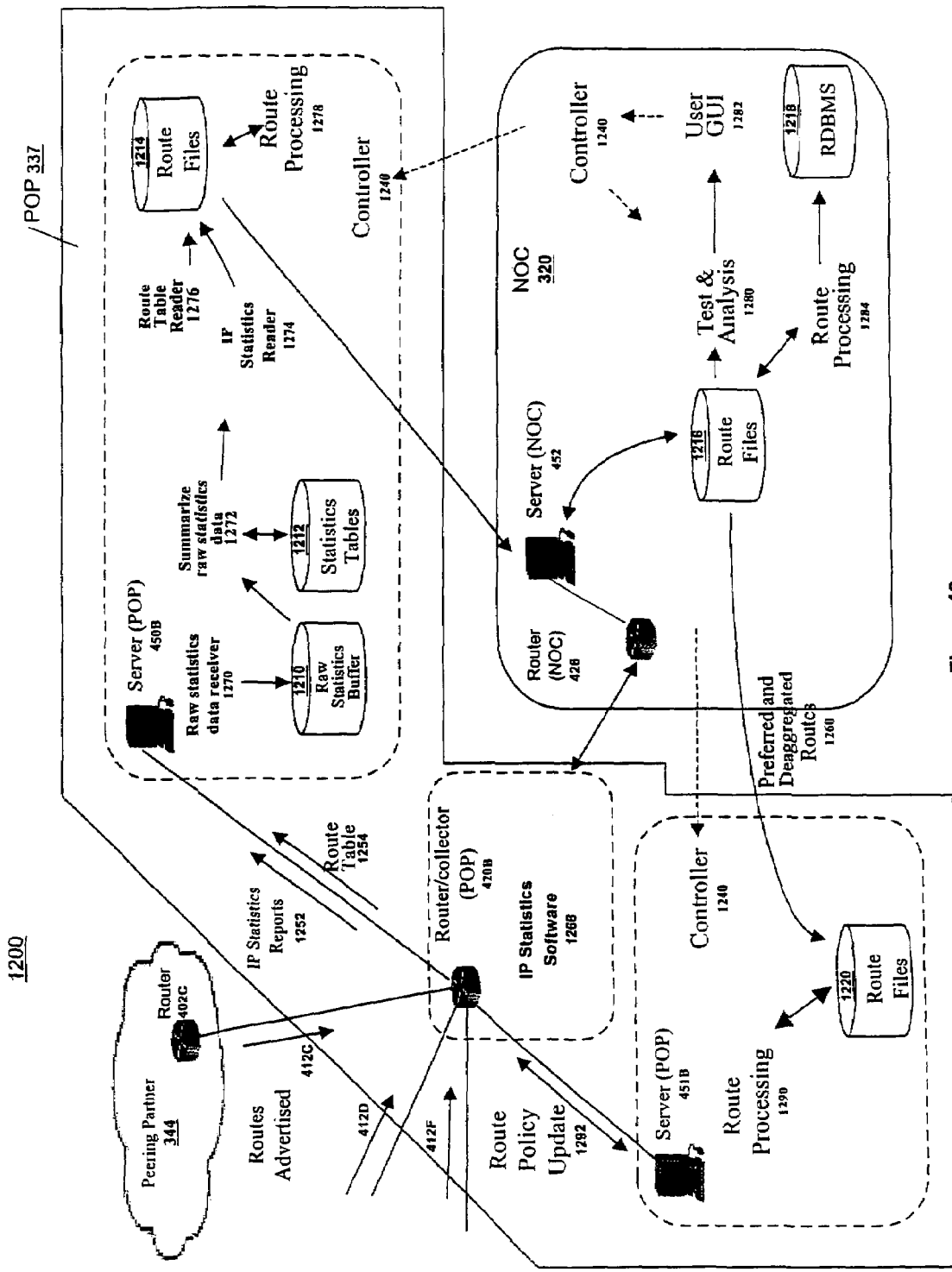
FIG. 12 is an illustration of information and processing flows in an intelligent routing system in an embodiment of the present invention.

FIG. 12 is an illustration of information and processing flows in an intelligent routing system. FIG. 12 demonstrates the flow of information between a peering partner 344, a POP 337, and a NOC 320 comprising a system 1200. The system 1200 represents a portion of an intelligent routing system network.

The peering partner 344 includes a router 402C that sends traffic to a POP 337. POP 337 includes a router/collector 420B and two servers 450B and 451B. The router/collector 420B routes system 1200 traffic and collects traffic statistics and other information. The NOC 320 includes a server 452 and a router 426. Router 426 is used to receive information from POP 337 and send NOC 320 information back to the POP 337.

Routes are advertised 412C, 412D and 412F to the router/collector 420B. At the router/collector 420B, an IP statistics software module 1268 collects IP statistics reports on traffic flowing through the router/collector 420B. The IP statistics software module 1268 also sets the minimum prefix length for the incoming IP statistics data by changing a configuration option within the router/collector. In one embodiment, a modified version of the Cisco® NetFlow services software is used to generate the IP statistics data.

IP statistics reports 1252 are sent to server 450B for processing. A software module for receiving the raw statistics data 1270 creates a raw statistics buffer 1210. The raw statistics buffer 1210 is used to double buffer the incoming IP statistics data packets. In one embodiment, the CflowMux software is used to receive NetFlow data.

A software module for summarizing the raw statistics data 1272 extracts the packets from the raw statistics buffer 1210 and updates a set of IP statistics tables 1212 accordingly. A IP statistics reader software module 1274 configured to read traffic reports from the IP statistics tables 1212 creates corresponding IP statistics data table entries in the route files 1214. In one embodiment, a modified version of the Cflowd software creates the statistics tables 1212 and also provides a Unix socket interface allowing the desired IP statistics to be extracted via a NetFlow reader. The NetFlow reader is based on a software module included in Cflowd called cfdnets.

A route table reader software module 1276 reads the route table 1254 from the router/collector 420B and uses the information to create route table entries in the POP route files 1214. Route processing software 1278 correlates the route table entries with the IP statistics data table entries in the POP route files 1214.

The information in the POP route files 1214 is transferred to the server 452 residing at the NOC 320. Route files from each of the POPs are combined and stored in the NOC route files 1216. NOC route processing software 1284 operates on the NOC route files 1216. In one embodiment, the NOC route files 1216 are stored in a real time database management storage system 1218 for long-term storage and analysis.

A test and analysis software module 1280 also operates on the NOC route files 1216. A User graphical user interface (GUI) 1282 displays the information obtained from the test and analysis module 1280. As will be evident to one of skill in the art, the test and analysis software 1280 and the GUI 1282 are optional, and may be used if additional automated checking and statistics are desired. For example, the GUI 1282 may be used to change control parameters and observe their effect on the statistics of the intelligent routing system.

A controller 1240 controls the other software modules within the NOC and the POP. The controller 1240 starts each software module in sequence, manages the data directories, and cleans up the files and directories of the system 1200. In one embodiment, a User GUI 1282 is used to input user commands into the controller 1240. In another embodiment, configuration files may be manipulated manually to alter the controller 1240 operations. The controller 1240 manages the automation of the process of collecting information at each POP, sending the collected information to the NOC, developing the address space map of the network, and using the address space map to preference and deaggregate routes. The controller 1240 also manages the automation of the process of preferencing routes and injecting deaggregation routes. It will be evident to one of skill in the art that the process of creating and using the address space map may also be performed manually. However, due to the large amounts of data being collected and the repetitive nature of the process, it is more efficient to automate the process.

Preferred and deaggregated routes 1260 are transferred from the NOC 320 to the POP route files 1220 residing on the POP server 451B. Additional POP route processing 1290 is performed on the POP route files 1220. The current router 420B configuration is collected, and the route processing 1290 compares the current router configuration to the desired router configuration given in the preferred and deaggregated route files 1220. Route processing 1290 generates a preferred route changes file and a deaggregated route changes file to be used in route policy updating 1292. Route policy updating 1292 preferences routes within the backbone network and injects deaggregated routes that will be announced throughout the intelligent routing system network.

Although the invention has been described in considerable detail with reference to certain embodiments, other embodiments are possible. As will be understood by those of skill in the art, the invention may be embodied in other specific forms without departing from the essential characteristics thereof. For example, a wide variety of peering partner, backbone, and POP configurations are possible within an intelligent routing system. The intelligent routing system may be implemented using other TCP/IP networks, and is not limited to Internet usage. Additionally, the granularity of the address space map developed within the intelligent routing system may vary, for example by varying the minimum prefix length on the IP statistics data monitored by the system. Accordingly, the present invention is intended to embrace all such alternatives, modifications and variations as fall within the spirit and scope of the appended claims and equivalents.

The invention claimed is:

1. A method for modifying routing using a topological address space map of a system having a plurality of networks connected to a backbone via a plurality of entry points, the method comprising:
monitoring, by a network device, the entry points of a plurality of messages arriving from the plurality of networks;
correlating the plurality of message entry points with their associated message source address ranges to develop the topological address space map of the system; and
using the topological address space map in conjunction with a program code to implement modified routing,
wherein said program code includes at least program code that preferences a route table route that is not selected naturally according to a network routing protocol and is not prohibited according to a network configuration parameter, subject to a determination that the route exceeds a signal quantity threshold,
wherein said topological address space map includes at least information associating said message source address ranges with their topologically closest backbone connection point.

2. The method of claim 1, wherein using the topological address space map to implement modified routing further comprises:
subject to a determination that the amount of messages from a first source address range arriving from a first path exceeds a first threshold amount, preferring all messages to a destination address within the first source address range to travel via the first path.

3. The method of claim 2, wherein using the topological address space map to implement modified routing further comprises:
subject to a determination that the first path has not been preferenced, and further subject to a determination that the amount of messages from the first source address range arriving from the first path exceeds a second threshold amount, deaggregating a published route associated with the first source address range.

4. The method of claim 3, wherein the first source address range is a group of addresses corresponding to the same Internet Protocol address and mask; the first threshold is a preset percentage of the total amount of messages from a first source address range; and wherein the second threshold is a preset percentage of the total amount of messages from a first source address range.

5. A method for performing traffic routing management in a network, the method comprising:
monitoring, by a network device, source address ranges for a plurality of signals;
monitoring arrival network connection points for the plurality of signals; and
developing a topological address space map of the network through a correlation of the monitored source address ranges for the plurality of signals with the arrival network connection points for the plurality of signals;
using the topological address space map in conjunction with a program code to implement modified routing,
wherein said program code includes at least program code that preferences a route table route that is not selected naturally according to a network routing protocol and is not prohibited according to a network configuration parameter, subject to a determination that the route exceeds a signal quantity threshold;
and wherein said topological address space map includes at least information associating said message source address ranges with their topologically closest backbone connection point.

6. The method of claim 5, further comprising:
using the topological address space map to route a signal to a network connection point closest to a destination address range of the signal; and
reconciling differences between the topological address space map and existing routes in the network.

7. The method of claim 6, wherein using the topological address space map further comprises injecting automatically a new route within the source address range of a signal into the network by using a Border Gateway Protocol session from an external system.

8. The method of claim 5, wherein developing the topological address space map of the network further comprises:
collecting route entries from a route table on a router in the network;
compiling automatically signal traffic statistics entries on the monitored plurality of signals passing through the router in the network; and
correlating each signal traffic statistics entry with a route entry, wherein each signal traffic statistics entry comprises:
a measure of the quantity of signals corresponding to a source address range;
an Internet Protocol address;
a prefix length for the Internet Protocol address range; and
an associated route entry.

9. The method of claim 6, wherein the plurality of signals monitored includes:
a predetermined portion of set of signals sent within the network; and
a set of signals generated to fill in portions of the topological address space map of the network to provide substantially equal signal coverage of the network, wherein monitoring is performed automatically and automatically used to develop the topological address space map; and wherein the process of using the topological address space map is performed automatically.

10. A computer program product for managing the routing of signals in a network, the computer program product comprising:
a computer readable medium that stores program code including:
program code that receives route entries from a route table in the network;
program code that receives Internet Protocol statistics data entries on signals flowing through one or more routers on the network, wherein each Internet Protocol statistics data entry includes a measure of the quantity of signals corresponding to a signal source address range;
program code that monitors source address ranges for a plurality of signals;
program code that monitors arrival network connection points for the plurality of signals;
program code that develops a topological address space map of the network using the route entries and Internet Protocol statistics data entries; and program code that implements the topological address space map; and
program code that uses the topological address space map to route a signal to a network connection point topologically closest to a destination address range of the signal, wherein program code that uses the topological address space map includes at least program code that preferences a route table route that is not selected naturally according to a network routing protocol and is not prohibited according to a network configuration parameter, subject to a determination that the route exceeds a signal quantity threshold.

11. The computer program product of claim 10, wherein program code that uses the topological address space map further comprises:

program code that injects a new route within the source address range of a signal into the network.

12. The computer program product of claim 10, wherein program code that uses the topological address space map further comprises program code that reconciles differences between the topological address map and existing routes in the network.

13. The computer program product of claim 10, wherein program code that develops the topological address space map of the network further comprises:

program code that collects route entries from a route table on a router in the network; and program code that compiles signal traffic statistics entries on the monitored plurality of signals passing through the router in the network, wherein each signal traffic statistics entry includes a measure of the quantity of signals corresponding to a source address range.

14. The computer program product of claim 13, further including program code that correlates each signal traffic statistics entry with a route entry.

15. The computer program product of claim 10, wherein program code that implements the topological address space map comprises program code that selects a preferred route.

16. The computer program product of claim 15, wherein program code that implements the topological address space map further comprises program code that selects a deaggregation route, wherein the program code that selects the deaggregation route comprises:

program code that selects as the deaggregation route a route corresponding to an Internet Protocol statistics data entry, wherein the route is more specific than the route table route currently announced to the network.

* * * * *